United States Patent [19]

Baretich et al.

[11] Patent Number: 5,747,972
[45] Date of Patent: May 5, 1998

[54] METHOD AND APPARATUS FOR ELECTRONIC POWER CONTROL

[75] Inventors: David F. Baretich, Lake Oswego, Oreg.; Gregory P. Wiegand, Poulsbo, Wash.

[73] Assignee: MicroPlanet Ltd., Poulsbo, Wash.

[21] Appl. No.: 371,512

[22] Filed: Jan. 11, 1995

[51] Int. Cl.$^6$ .............................. G05F 1/613; G05F 1/44
[52] U.S. Cl. ................................. 323/223; 323/283
[58] Field of Search ............................ 323/223, 224, 323/225, 283, 284, 285

[56] References Cited

U.S. PATENT DOCUMENTS

| | | | |
|---|---|---|---|
| 4,052,648 | 10/1977 | Nolan | 318/200 |
| 4,266,177 | 5/1981 | Nolan | 318/810 |
| 4,404,511 | 9/1983 | Nolan | 318/729 |
| 4,417,190 | 11/1983 | Nolan | 318/729 |
| 4,426,614 | 1/1984 | Nolan | 323/243 |
| 4,433,276 | 2/1984 | Nolan | 318/729 |
| 4,439,718 | 3/1984 | Nolan | 318/729 |
| 4,459,528 | 7/1984 | Nolan | 318/729 |
| 4,469,998 | 9/1984 | Nolan | 318/729 |
| 4,476,441 | 10/1984 | Gulczynski | 330/262 |
| 4,573,018 | 2/1986 | Mirow | 330/10 |
| 4,628,425 | 12/1986 | Venturini et al. | 363/10 |
| 4,641,232 | 2/1987 | Pitel | 363/71 |
| 4,736,286 | 4/1988 | Gulczynski | 363/70 |
| 4,803,610 | 2/1989 | Gulczynski | 363/70 |
| 4,845,391 | 7/1989 | Gulczynski | 307/631 |
| 4,853,837 | 8/1989 | Gulczynski | 363/80 |
| 4,871,980 | 10/1989 | Gulczynski | 330/295 |
| 4,896,254 | 1/1990 | Bennett | 363/50 |
| 4,940,906 | 7/1990 | Gulczynski | 307/296.1 |
| 4,947,308 | 8/1990 | Gulczynski | 363/16 |
| 4,947,311 | 8/1990 | Peterson | 363/124 |
| 4,949,234 | 8/1990 | Gulczynski | 363/48 |
| 4,956,760 | 9/1990 | Gulczynski | 363/16 |
| 4,980,649 | 12/1990 | Gulczynski | 330/10 |
| 4,999,568 | 3/1991 | Gulczynski | 323/351 |
| 5,057,990 | 10/1991 | Gulczynski | 363/131 |
| 5,060,130 | 10/1991 | Steigerwald | 363/65 |
| 5,099,410 | 3/1992 | Divan | 363/98 |
| 5,136,494 | 8/1992 | Akagi et al. | 363/34 |
| 5,146,399 | 9/1992 | Gucyski | 363/89 |
| 5,155,430 | 10/1992 | Gulczynski | 323/224 |
| 5,163,173 | 11/1992 | Casagrande | 323/335 |
| 5,164,656 | 11/1992 | Gulczynski | 323/222 |

(List continued on next page.)

OTHER PUBLICATIONS

Marco V. M. Villaco and Arnaldo J. Perin, "A New Bidirectional ZVS Swich for Direct AC/AC Converter Applications," 0-7803-2482-x/95—IEEE Proceedings, pp. 977-983, 1995.

(List continued on next page.)

*Primary Examiner*—Peter S. Wong
*Assistant Examiner*—Bao Q. Vu
*Attorney, Agent, or Firm*—Patrick M. Dwyer

[57] ABSTRACT

The method of the invention in one aspect involves electronic power control by varying the amplitude of an electrical power supply voltage, independent of frequency, whereby the output frequency will always be the same as the input frequency. An electrical circuit apparatus for accomplishing this function in a preferred embodiment is also disclosed herein. The preferred circuitry of this aspect of the invention uses four solid state switches, such as IGBT's, four diodes, an inductor, input and output filters and novel controlling circuitry. The controller apparatus and methods of the invention may be used to implement all otherwise conventional converter types, buck, boost, and inverting (and duals of these) versions to obtain different regulating characteristics, including galvanic isolation of the output from the input.

The inventive methods and devices may be used in power factor correction, voltage and/or current harmonic filtering and neutralization, line and load conditioning, control of power transfer between two power grids, and programmable control of surges, sags, dropouts and most other voltage regulation problems.

13 Claims, 34 Drawing Sheets

U.S. PATENT DOCUMENTS

| | | | |
|---|---|---|---|
| 5,196,995 | 3/1993 | Gulczynski | 363/16 |
| 5,198,969 | 3/1993 | Redl et al. | 363/17 |
| 5,221,887 | 6/1993 | Gulczynski | 323/285 |
| 5,225,767 | 7/1993 | Gulczynski | 323/282 |
| 5,235,504 | 8/1993 | Sood | 363/53 |
| 5,262,932 | 11/1993 | Stanley et al. | 363/26 |
| 5,267,132 | 11/1993 | Gulczynski | 363/16 |
| 5,270,904 | 12/1993 | Gulczynski | 363/97 |
| 5,283,726 | 2/1994 | Wilkerson | 363/41 |
| 5,291,119 | 3/1994 | Cowett, Jr. | 323/207 |
| 5,422,778 | 6/1995 | Good et al. | 361/92 |

OTHER PUBLICATIONS

Dr. Prasad Enjeti and Phillip diZerega, "A Component–Minimized Single–Phase to Three–Phase Converter for Induction Motors," Motion, pp. 23–28, Jun. 1994.

Chingchi Chen and Deepakraj M. Divan, "Simple Topologies for Single Phase AC Line Conditioning," IEEE Transactions on Industry Applications, vol. 30 No. 2, Mar./Apr. 1994.

Excerpt from Power Engineering Journal, pp. 32–33, Feb. 1994.

Bruce D. Moore, "Regulator Topologies Standardize Battery–Powered Systems," EDN, Jan. 20, 1994.

Khaled E. Addoweesh, "An Exact Analysis of an Ideal Static AC Chopper," Int. J. Electronics, vol. 75, No. 5, pp. 999–1013, 1993.

Shibashis Bhowmik, "A Guide to the Application–Oriented Selection of AC/AC Converter Topologies," IEEE Transactions on Power Electronics, vol. 8 No. 2, Apr. 1993.

Danfoss publication on Adjustable Speed Drives for AC and DC Motor Control, 1993.

Bimal K. Bose, "Power Electronics—A Technology Review," Proceedings of the IEEE, vol. 80 No. 8, Aug. 1992.

Charles L. Neft and Colin D. Schauder, "Theory and Design of a 30–hp Matrix Converter," IEEE Transactions of Industry Applications, vol. 28 No. 3, May 1992.

Dong Y. Huh, Hwan H. Sung and Gyu H. Cho, "Comparative Study of Electronic Transformers Using Resonant and Nonresonant Switching Converters," IEEE Paper 0–7803–0695–3/92, 1992.

Donald G. Holmes, "Implications of a Controlled Rectifier Using AC–AC Matrix Converter Theory," IEEE Transactions on Power Electronics, vol. 7 No. 1, Jan. 1992.

Bimal K. Bose, "Recent Advances in Power Electronics," IEEE Transactions on Power Electronics, vol. 7 No. 1, Jan. 1992.

Jung G. Hoe and Gyu H. Cho, "Soft–Switched Matrix Converter for High Frequency Direct AC–to–AC Power Conversion," Int. J. Electronics, vol. 72 No. 4, pp. 669–680, 1992.

Sadeq A. Hamed, "Steady–State Modelling, Analysis, and Performance of Transistor–Controlled AC Power Conditioning Systems," IEEE Transactions on Power Electronics, vol. 5 No. 3, Jul. 1990.

Luis Moran, Phoivos Ziogos and Geza Joos, "A Three–Phase Solid–State Voltage Compensator System," Can. J. Elect. & Comp. Eng., vol. 15 No. 1, pp. 27–35, 1990.

S. A. Hamed, "Modelling and Design of Transistor–Controlled AC Voltage Regulators," Int. J. Electronics, vol. 9 No. 3, pp. 421–434, 1990.

Exerpt from IEEE Transactions on Industry Applications, vol. 25 No. 4, p. 610, Jul./Aug. 1989.

Alberto Alesina and Marco G. B. Venturini, "Analysis and Design of Optimum–Amplitiude Nine–Switch Direct AC–AC Converters," IEEE Transactions on Power Electronics, vol. 4 No. 1, Jan. 1989.

Thomas A. Lipo, "Recent Progress in the Development of Solid–State AC Motor Drives," IEEE Transactions on Power Electronics, vol. 3 No. 2, pp. 105–117, Apr. 1988.

Gilles Roy, Pierre Poitevin, and Guy Olivier, "A Comparative Study of Single–Phase Modulated AC Choppers," IEEE Transactions on Industry Applications, vol. IA–20 No. 6, pp. 1498–1506, Nov./Dec. 1984.

S. Ashoka Krishna Bhat and Joseph Vithayathil, "A Simple Multiple Pulsewidth Modulated AC Chopper," IEEE Transactions on Idustrial Electronics, vol. IE–29 No. 3, pp. 185–189, Aug. 1982.

Francisc C. Schwarz, "A Doublesided Cycloconverter," IEEE Transaction on Industrial Electronics and Control Instrumentation, vol. IECI–28 No. 4, pp. 282–291, Nov. 1981.

Alexander Eigeles Emanuel, "A Simplified Dual Cycloconverter," IEEE Transactions on Industrial Electronics and Control Instrumentation, vol. IECI–28 No. 4, pp. 249–252, Nov. 1981.

S. Ashoka Krishna Bhat, "Digitally Controlled Multiple–Pulse–Width–Modulated AC Chopper for Power Control," Int. J. Electronics, vol. 51 No. 1, pp. 45–46, 1981.

Alexander Mozdzer, Jr. and Bimal K. Bose, "Three–Phase AC Power Control Using Power Transistors," IEEE Transactions on Industry Applications, vol. IA–12 No. 5, pp. 499–505, Sep./Oct. 1976.

"A.C. Voltage Regulation by Means od Chopper Circuits," excerpt from Electronics Letters, vol. 4 No. 2, Jan. 26, 1968.

Richard M. Petrecca, "Mitigating the Effects of Harmonics and Other Disturbances with an Active Power Line Conditioner," possibly unpublished paper, no date.

Marco Venturini, "A New Sine Wave Out Conversion Technique Eliminates Reactive Elements," Proceedings of Powercon, no date.

Excerpt from LIPO: Development of Solid–State AC Motor Drives, p. 107, no date, no publisher info avail.

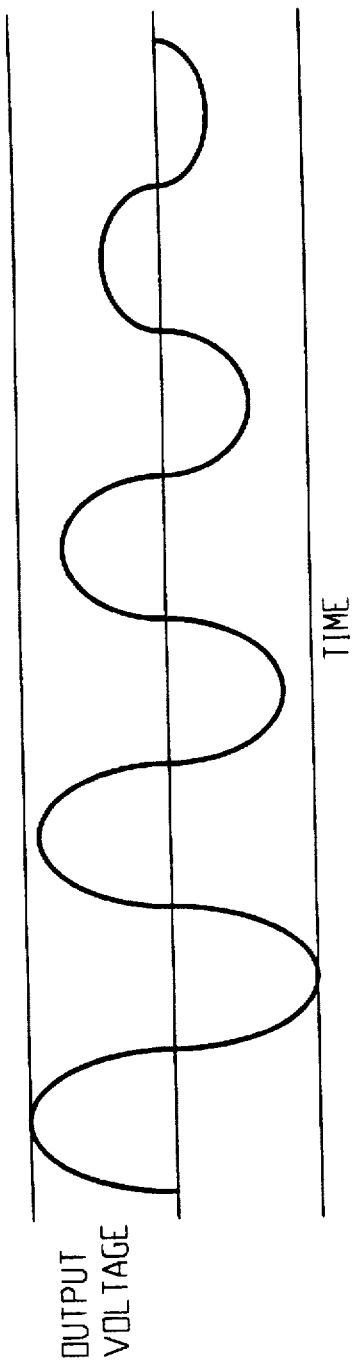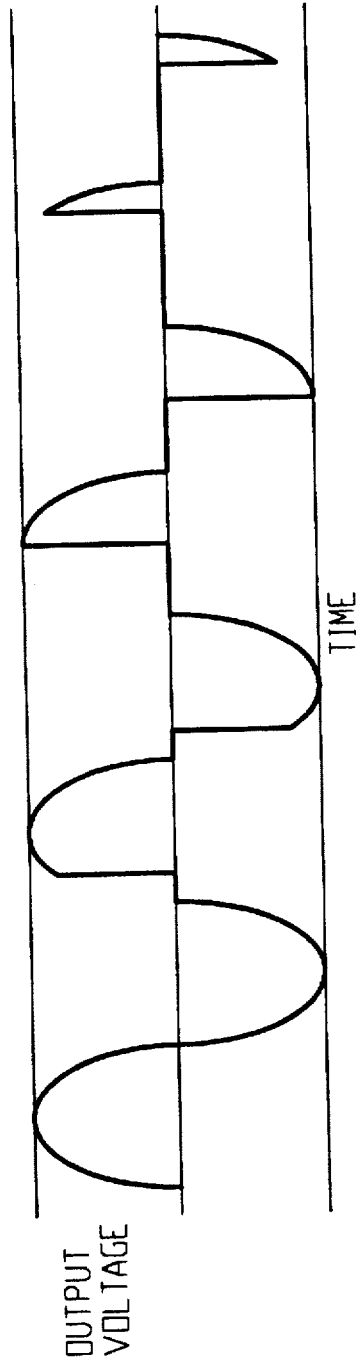

Fig. 27

Buck Mode MPC

| 120 V AC rms | % of range | KW Eff | KVA Eff | Input KW | Input KVA | Input FF | Input %THD-rmsA | Output KW | Output KVA | Output FF | Output %THD-rmsA |
|---|---|---|---|---|---|---|---|---|---|---|---|
| 120 | 100% | 95.92% | 94.00% | 4.9 | 5 | 0.97 | 3.8 | 4.7 | 4.7 | 1 | 1.85 |
| 108 | 90% | 95.65% | 91.67% | 4.6 | 4.8 | 0.97 | 4 | 4.4 | 4.4 | 1 | 1.85 |
| 96 | 80% | 94.74% | 92.31% | 3.8 | 3.9 | 0.97 | 4.2 | 3.6 | 3.6 | 1 | 1.85 |
| 84 | 70% | 93.75% | 90.91% | 3.2 | 3.3 | 0.96 | 4.7 | 3 | 3 | 1 | 1.9 |
| 72 | 60% | 92.31% | 88.89% | 2.6 | 2.7 | 0.95 | 5.5 | 2.4 | 2.4 | 1 | 1.9 |
| 60 | 50% | 89.00% | 80.91% | 2 | 2.2 | 0.93 | 6.5 | 1.78 | 1.78 | 1 | 1.95 |
| 48 | 40% | 85.71% | 76.36% | 1.47 | 1.65 | 0.89 | 8 | 1.26 | 1.26 | 1 | 2 |
| 36 | 30% | 82.65% | 66.94% | 0.98 | 1.21 | 0.81 | 10.3 | 0.81 | 0.81 | 1 | 2.2 |
| 24 | 20% | 74.58% | 48.89% | 0.59 | 0.9 | 0.65 | 13.2 | 0.44 | 0.44 | 1 | 2.3 |
| 12 | 10% | 53.45% | 21.53% | 0.29 | 0.72 | 0.4 | 15.8 | 0.155 | 0.155 | 1 | 3.4 |
| 0 | 0% | 0.00% | 0.00% | 0.1 | 0.66 | 0.15 | 16.7 | 0 | 0 | 0.85 | |

SCR

| V AC rms | % of range | KW Eff | KVA Eff | Input KW | Input KVA | Input FF | Input %THD-rmsA | Output KW | Output KVA | Output FF | Output %THD-rmsA |
|---|---|---|---|---|---|---|---|---|---|---|---|
| 120 | 100% | 98.04% | 98.04% | 5.1 | 5.1 | 0.99 | 12.4 | 5 | 5 | 0.99 | 11.5 |
| 108 | 90% | 97.87% | 98.00% | 4.7 | 5 | 0.94 | 27.9 | 4.6 | 4.9 | 0.94 | 27.7 |
| 96 | 80% | 97.44% | 97.87% | 3.9 | 4.7 | 0.84 | 42.5 | 3.8 | 4.6 | 0.83 | 42.9 |
| 84 | 70% | 96.88% | 97.67% | 3.2 | 4.3 | 0.73 | 52.7 | 3.1 | 4.2 | 0.73 | 52.7 |
| 72 | 60% | 96.15% | 97.50% | 2.6 | 4 | 0.63 | 60.3 | 2.5 | 3.9 | 0.63 | 60.2 |
| 60 | 50% | 94.74% | 97.22% | 1.9 | 3.6 | 0.54 | 66.4 | 1.8 | 3.5 | 0.52 | 66.5 |
| 48 | 40% | 92.86% | 96.88% | 1.4 | 3.2 | 0.43 | 72.1 | 1.3 | 3.1 | 0.42 | 72.4 |
| 36 | 30% | 100.00% | 96.43% | 0.9 | 2.8 | 0.34 | 77.5 | 0.9 | 2.7 | 0.32 | 77.9 |
| 24 | 20% | 100.00% | 100.00% | 0.5 | 2.2 | 0.24 | 84.2 | 0.5 | 2.2 | 0.22 | 84.4 |
| 12 | 10% | | | | Unstable | | | | Unstable | | |
| 0 | 0% | | | | | | | | | | |

METHOD AND APPARATUS FOR ELECTRONIC POWER CONTROL

TECHNICAL FIELD

The invention relates to the field of electrical power conversion and control, across a wide range of current and voltages; more particularly, it relates to method and apparatus for electronically implemented power control, more particularly, those implemented with switch mode power conversion techniques.

BACKGROUND OF THE INVENTION

An electrical power conversion circuit is a circuit in which electrical power is changed so that a power source with a voltage or current can serve a load requiring a predetermined voltage or current. In switch mode conversion circuits and power conversion techniques, power is typically changed from a supply that is higher in current or voltage to serve a load requiring lower current or voltage, or from a supply that is lower in voltage or current to a load requiring higher voltage or current. Where high conversion efficiency is made possible by design of the circuit, power output is substantially equal to power input. Where voltage-ampere products (VA) are close to the same at both output and input, and assuming a fixed VA at the input, a reduction in voltage at a resistive load is necessarily accompanied by an increase in load current, and vice-versa.

There are three basic classes of switch mode power converters. They include step-down (buck—see FIG. 1), step-up (boost), inverting (including flyback) converters, and "duals" of these three. A "dual" version of any of the three basic class devices can sometimes be effected by a simple transform as follows:

Series inductors become parallel capacitors;
Parallel capacitors becomes series inductors.

Other transforms can be more involved, and the above transforms are provided as illustrative only, as will be appreciated by those skilled in the art. Dual topologies are known to have the following characteristics: a) discontinuous currents to and from the voltage sources become continuous currents to and from voltage sources; b) the DC transfer function (output voltage vs. input voltage vs. duty cycle) remains the same; and c) the dual input and output inductors can be combined together in one magnetic structure.

In all such topologies, each converter typically consists of two switches, an inductor, and input and output filters. Nearly all conventional converters are some derivation or combination of these classes and their duals.

Output voltage regulation in these known converter topologies then is achieved by varying the duty cycle of the switches. FIG. 1 shows a simple buck converter with ideal switches. In DC conversion circuits of the type generally known as buck or boost regulators, the two solid state switches typically employed are reciprocally and cyclically operated so that one switch is "on" or conducting, while the other is "off" or non-conducting, and vice-versa. Thus as the duty cycle of the modulation of the two switches is varied, so is the voltage (or current) conversion ratio varied between source and load. For example, in a buck topology, if S1 is modulated at a given duty cycle D and S2 is modulated exactly opposite S1 (S2 closed when S1 is open and vice versa) then output voltage is given by the formula:

$$V_{out} = V_{in} * D.$$

Other known formulae similarly apply to other respective known regulator classes, as will be appreciated by those skilled in the art. This relationship holds for either polarity of $V_{in}$. Theoretically then, alternating voltage on the input would manifest itself on the output according to the same relationship, assuming the use of "ideal" switches. However, as a matter of practice, in the absence of such ideal switches, conventional single stage converter implementations do not function in AC to AC conversions.

In conversion circuits used to drive reactive loads such as induction motors, bi-directional energy flows resultant from four quadrant operation must also be accommodated. Simple power transformers are in common usage, though necessarily restricted to AC power conversion; however, they grow heavy and bulky as power levels increase, and they are by nature not readily variable in their conversion ratios without some kind of tap changing modification.

There has been some work done in the area of AC converters, but known methods suffer for one or more reasons. For instance, some employ simplistic control schemes that lead to a variety of failure modes in the switches.

In all real world switches, there exist timing delays and finite rise/fall times, both of which vary from device to device and over varying operating conditions. If care is not taken in a conventional two switch converter as outlined above, both switches could conduct simultaneously, with attendant high currents and excessive power dissipation which can destroy the switches.

Power transistors of some of the types commonly employed as switches in converter topologies (and other semiconductors similarly employed) are known to store significant amounts of charge, and if a control voltage is applied to turn one transistor off as the control voltage is being applied to turn the other transistor on, the flow of current in the first transistor would continue for sometime after the turn off control, and simultaneous conduction in both transistors would occur to cause a short across the power source, with potentially damaging current flow through the switches.

A simultaneous "off" condition for both transistors is also a problem, for if the first transistor is turned off before the second transistor is turned on, the series inductor in such regulating circuits (in series with the opening switch) would discharge through the opening switch and subject the switch to potentially damaging voltage.

One known technique for dealing with the first phenomenon is the addition of a switching delay, or dead time, into the turn-on of each switch, after turn-off of the other switch. Generally, a value for the length of the switching delay is chosen to insure that one switch is completely off before the other is enabled. But in the AC circuit supposed above, that then results in both switches being disabled at the same time. And as discussed above, if any current is flowing in the output inductor L1, then the result of both switches simultaneously disabled is a voltage spike across the switches which will likely destroy them. This spike typically has to be clamped via some snubber or clamping network, but that then results in excessive clamp power dissipation and excessive switching losses in the switches. For an example of a manifestation of this problem, and an example of this limiting solution, see U.S. Pat. No. 4,947,311 to Peterson, the disclosure of which is hereby incorporated by this reference into this disclosure as background as if fully set forth.

Switching losses into an inductive load, as encountered in conventional circuits, are generally proportional to the product of turnoff time, peak current, peak voltage, and switching frequency, and can be calculated from the well known formula:

$$P_{SW}=0.5t_{off}*V_{peak}*I_{peak}*\text{Frequency}$$

where $P_{SW}$ is the switching loss expressed in units of power. In a snubbed or clamped circuit, there is always a voltage rise across the snubber during dead time as long as either current or voltage is non-zero. As a result, there is always a significant switch or snubber dissipation. In addition, during high current surge conditions, the snubber may not be able to adequately limit the voltage rise, leading to potentially catastrophic device failure.

These known circuits therefore have significant limits in capability of conversion, at least in terms of output power, efficiency, reliability and cost. This is especially the case with present high power semiconductor technology where higher power and lower cost devices are also generally the slowest, and therefore have inherent and unacceptably high switching losses.

AC power quality is best and electrical operating efficiency is greatest when the line current is sinusoidal in wave form and in phase with the line voltage. It is well known however that electrical elements such as reactive loads shift the line current in the mains out of phase with the line voltage. This phase shift is commonly defined in terms of "power factor", or more specifically, "displacement power factor", where displacement power factor (referred to hereafter for sake of simplicity as PF or as power factor) is given by the well known relationship:

$$PF=\cos\theta$$

where $\theta$ is the degree of phase shift "lead" (or "lag", as the case might be) between voltage and current. A perfect, or in-phase, relationship is equated to 1.0, while increasing degrees of phase shift are represented by power factors decreasing below unity. Power factor is also sometimes defined as the ratio of "true" power (in watts) to apparent power (in volt-amperes, or VA).

Power factor is therefore a measure of relative efficiency of power transfer and energy usage, and becomes more critical with the use of heavy draw machinery and the like, such as motors. Typical induction motor power factors can range from very low at no load to around 0.85 to 0.90 ("perfect" is 1.00) at full load. Utility services typically add surcharges to customers with power factors below anywhere between 0.80 and 0.90. In addition, power factor can be highly variable, depending as it does on the instantaneous total load on the power supply. Power factor correction ("PFC") then is therefore routinely applied to compensate for bad power factor situations and, through better utilization of the existing power distribution system, to reduce the need for capital intensive additions to the power grid. Power factor correction is conventionally accomplished generally by having a series of capacitors across the line, and switching the various capacitors in and out with thyristors or relays.

Other conventional PFC techniques consist of a bridge of transistors that operate with a storage bank of capacitors or batteries (for example, see Wilkerson U.S. Pat. No. 5,283,726). A major disadvantage of this conventional PFC technique is that the output switches always switch to and from the DC storage bank voltage, which is above the peak power line voltage. As a result, switching losses are quite high.

Known automatic power factor correctors are bulky, slow and complex, and therefore only practical for large motors and groups of smaller motors. Even then, it is only the "system average" PF that is corrected, and studies show that it is preferable to correct PF at the load, rather than at the system level. For the above reasons, and other as will be appreciated by those skilled in the art, it is not practical to connect conventional PFC equipment at each load (motor). This is significant in that 60% of the electrical energy produced at this time is consumed by electric motors of 5 hp or greater in size (fully 80% of industrial consumption of electricity is for motors). And this at a time when annual electricity production is valued in excess of $52 billion! Any significant reduction in electrical consumption by these motors and/or increase in their efficiency of consumption would result in huge dollar savings.

In addition, other elements such as rectifying power supplies and SCR's, and other non-linear sources such as computers, switchmode power supplies, welders, inverters, controlled bridge rectifiers, fluorescent lights and other lights requiring a ballast, actually alter the sinusoidal waveform of the AC line current. These non-linear devices typically only draw current when the voltage is at its peak, thus causing the harmonic distortion. This is not how the power grid was designed to work.

The resulting non-sinusoidal current produced by these nonlinear loads can be mathematically resolved into a "fundamental" sine wave current at line frequency, with a number of harmonic waves at multiples of line frequency, with the fundamental producing the power in the load, while the so called "harmonics" only increase heat losses and decrease the system's power factor (that is, they generally lower the efficiency of the distribution system) with no net contribution to power in the load. Electrical industry estimates predict that by the year 2000, as much as 60% of all electrical loads will be such nonlinear, solid state electronic loads, so that the majority of all future electrical loads will consist of unwanted harmonic generators.

This is already even true for conventional PFC techniques that, in addition to other noted disadvantages, also react themselves to exacerbate harmonic problems, amplify circuit resonances, and even cause "ringing" on the mains when capacitors are switched. This ringing can cause malfunctioning and shutdowns in adjustable speed motor drives and other electronic equipment.

As discussed above, each non-linear device produces its own distorted waveform composed of varying harmonic components. Each device allows current to pass during a portion of the voltage sine wave and blocks the flow of current during another portion of the sine wave. Too make matters worse, phase controlled devices such as adjustable speed drives (SCR) generate harmonic currents with amplitudes varying as a function of load change. In addition, the continued trend in government regulation appears to be towards increasing energy efficiency, and is eventually expected to mandate harmonic cleanup at the source. All of this suggests that power quality (PQ) issues are a major concern, and that there is a clear need for PFC and PQ techniques that more efficiently use power without also generating harmonic distortion themselves.

It has been suggested that the variety of power quality problems, now extant and steadily growing in magnitude and variety, are all actually summed within a power distribution system, producing effects such as: deterioration of electronic equipment performance, and continuous or sporadic computer and other microprocessor malfunctions; tripping protection circuitry of adjustable speed drives; overheating of neutral in three phase systems, leading to neutral burnout; overheating and premature failure of transformers, even when the transformer rating appears otherwise adequate; overheating of motors; nuisance tripping of circuit breakers; telephone interference; and PFC capacitor fuse blowing.

In addition, the need for improved power regulation and/or power conversion is felt in other industries as well. For instance, in the motion picture and entertainment industries, conventional light source dimming technologies produce an audible 60 Hz hum in large studio lamps. The conventional technology generally applied is dimming by means of phase angle fired triacs, which limit the energy to the lamps by basically opening the circuit to the lamps for a given percentage of every half cycle (see example of resultant broken waveform in FIG. 2). This scheme is relatively simple to implement, but is electrically very noisy, which leads to additional design problems and additional implementation costs. A means of smoothly and quietly dimming such lamps would be of great use.

SUMMARY OF THE INVENTION

Accordingly, it is an object of the invention to provide a power controller that is low in electrical and audible noise, applicable to both low and high power applications, having high tolerance for inductive loads, light in weight, digitally controllable, and fast in response time.

It is a further object of the invention to provide a power converter having output power, efficiency, reliability and cost superior to known topologies.

It is another object of the invention to provide a power converter with reduced total switching losses.

It is another object of the invention to provide a power converter that during high current surge conditions and reactive currents is not subject to switch device failure due to voltage rise.

It is a further object of the invention to provide a power converter adapted for four quadrant operation, with respect to input and output voltage and current.

It is another object of the invention to provide a converter/controller topology that addresses the disadvantages of conventional active PFC techniques where output switches always switch to and from the storage bank voltage, which is above the peak power line voltage, resulting in unacceptably high conduction and switching losses.

It is another object of the invention to provide a relatively inexpensive, fast response, self-dampening power factor corrector of size and bulk sufficiently small to be practical for the majority of motors in current and future use, and which does not contribute to line harmonic problems or problems of system resonance and ringing caused by capacitor switching.

It is another object of the invention to provide a power controller for assuring best power quality and greatest electrical operating efficiency by controlling an AC source to provide current and voltage outputs that are sinusoidal in waveform and in phase with each other.

It is another object of the invention to provide a power controller for neutralizing line harmonics.

It is another object of the invention to provide a power controller for successfully addressing any one or more of the following power quality concerns: deterioration of electronic equipment performance, and continuous or sporadic computer and other microprocessor malfunctions; overheating and premature failure of transformers, even when the transformer rating appears otherwise adequate; overheating of motors; nuisance tripping of circuit breakers; telephone interference; and PFC capacitor fuse blowing.

It is another object of the invention to provide a power line conditioner to mitigate voltage swells and sags, and overvoltage and under voltage conditions.

It is a further object of the invention to provide a means of dimming lamps in such a way as to produce no audible hum.

It is yet another object of the invention to provide a system meeting any one or a combination of all of the needs summarized above.

These and such other objects of the invention as will become evident from the disclosure below are met by the invention disclosed herein.

The invention addresses and provides such a system. The invention represents means to quickly, precisely, and remotely convert AC power with losses that are lower than conventionally available technology can provide. It also represents a compact, efficient, and low cost device for processing AC power, and that is simple and reliable and low in electrical noise, applicable to both low and high power applications, having high tolerance for reactive loads, light in weight, digitally controllable, and fast in response time.

Application of the invention to solutions to power quality problems, especially solutions requiring variable amplification, is especially beneficial in that the invention is the only system that effectively provides full four quadrant operation in a single stage AC power conversion device, particularly with respect to reactive loads, and which utilizes four independently controllable switches.

The invention provides an electrical power controller (also sometimes referred to herein as a regulator or converter) apparatus or device for controlling or regulating an AC input line voltage to a load. The voltage may be in single or multiple phase (such as conventional three phase) configurations. The controller device has four independently controllable switches and at least one inductor for each input line (or phase) to be regulated, all in one of several otherwise conventional power regulator topologies, such as buck, boost, inverted or isolated converter/regulators or duals of these topologies. A corresponding regulation or conversion scheme may thus be implemented depending upon the position of the inductor with respect to the switches and the input voltage, as will be appreciated by those skilled in the art.

The controller also has a logic control block. The logic control block is comprised in part of a polarity detector preferably in parallel with the input voltage. The polarity detector preferably has two outputs, each of which is the reciprocal of the other (inverted with respect to each other), although this may be accomplished in a number of functionally equivalent ways, such as through use of one or more inverters, as will be appreciated by those skilled in the art. The logic control unit also has a duty cycle modulator with two reciprocal outputs. Each switch is then separately modulated by these detector and modulator outputs under logical control so that some combination of one or more switches is always electrically conducting, or "closed". In other words, so there is never a combination of all four switches that is open, except of course when the device is not in operation (turned off or out of the circuit), or so that there is always an electrically conducting path through the switches.

Each switch thus turns off only into the instantaneous line voltage (ILV), rather than switching to a storage bank voltage or DC rail. Since the ILV can be as low as zero, losses are thereby reduced to the extent the ILV is lower than a storage bank voltage or that of a DC rail. Typically, this can save 36% or more in switching losses alone, even for resistive loads (with greater savings possible for reactive loads).

A variation of this device has 4 OR gates fed by outputs from the polarity detector and the duty cycle modulator through turn off and turn on delays, respectively, such that first and third OR gates each receive as a first input a first output from the polarity detector, and second and fourth OR gates each receive as a first input a second output from the polarity detector; and such that first and second OR gates receive as a 2nd input a first output from the duty cycle modulator, and third and fourth OR gates receive as a 2nd input a second output from the duty cycle modulator. The output from each OR gate controls or modulates or drives one switch or gate each. Preferably, the switch sources of each pair of switches are tied together, but do not have to be in some alternate embodiments.

In preferred embodiments of the controller device, at least one of, and preferably all of, the switches are electronically controllable, though alternate, non-electrical, implementations may occur to those skilled in the art, including partially or fully manual control schemes, and control schemes involving conducted light optics, such as fiber optical control means. Preferably each switch is a solid state switching device, with a diode poled to have a sense opposite to the switch, in parallel across the source and drain of the switch, and the diodes of a pair of such switches are opposite in sense to each other. The switches are preferably transistors, such as BJT (bipolar junction transistors), IGBT, or MOSFET transistors, or even thyristors such as MCT or GTO.

One embodiment of the controller device conforming otherwise in general to buck regulator topology has two switches in series with each other, though preferably poled in the opposite sense from each other, and connected with the inductor to one input, and two switches in series with each other, also preferably poled in the opposite sense from each other, and connected with the inductor to the return. In other words, wherein a first pair of switches is connected between the input and the inductor, and a second pair of switches is connected between the inductor and return.

As employed in this disclosure, the term "poled in the opposite sense" when referring to electronic devices that resist or obstruct the flow of current in one direction (usually under a set of defined conditions), but not in the other, means they are placed so that current flow is not blocked in the same direction in both devices; in other words, their "poles" are oppositely arranged, as will be appreciated by those skilled in the art.

In another aspect of the invention, there is separately provided a logic controller for controlling the duty cycle of a power controller. The logic controller is particularly adapted for controlling a power controller device that has four independently controlled separate switches. The logic controller has a polarity detector in parallel with the input voltage that has two outputs, and it has a duty cycle modulator that also has two outputs. Each of the outputs of the polarity detector and of the duty cycle modulator are inverted with respect to one another (reciprocal). The controller is employed in such a way that each of the four switches to be controlled is separately modulated so that some combination of one or more switches is always closed. Turn off or turn on delays may optionally be employed.

Preferred embodiments of the controller device employ four OR gates fed by outputs from the polarity detector and the duty cycle modulator through optional turn off and turn on delays, respectively, such that first and third OR gates each receive as a first input a first output from the polarity detector, and second and fourth OR gates each receive as a first input a second output from the polarity detector; and such that first and second OR gates receive as a second input a first output from the duty cycle modulator, and third and fourth OR gates receive as a second input a second output from the duty cycle modulator. Output from each OR gate modulates or drives one switch or gate each.

The invention also provides several method aspects. In one embodiment, a method of power regulation or conversion is provided whereby an amplitude of an input voltage waveform is varied linearly, without respect to its frequency, and without changing its characteristic waveform, to produce a proportional output voltage to a load, employing only a single stage.

In a variation of this method, the above referred to voltage amplitude variation is accomplished by variable duty cycle modulation switching of an input voltage through an inductor in a manner otherwise consistent with conventional power regulation topology.

A preferred method for accomplishing the variable duty cycle modulation follows these steps: 1) sensing in real time a polarity of the input voltage to derive a pair of polarity signals that are inverted with respect to each other; 2) varying the duty cycle of a modulator, in accordance with and in proportion to the desired modification of the amplitude, the modulator having two outputs inverted with respect to each other; 3) feeding a polarity signal and a modulator output signal to an OR gate, where each signal has a duration, and the beginning of the duration of the duty cycle modulating output signal is delayed, and the end of the duration of the polarity signal is also delayed; 4) using the OR gate logical output to control a switching device for the variable duty cycle modulation of the input voltage. These method steps 1–4 are then preferably iterated separately for each of four OR gates, and the step of variable duty cycle modulation switching of the input voltage includes the step of modulating the switching during operation so that all of the switches in the controller of the invention are not ever electrically non-conducting (or "open") at the same time (except when there is no power applied to the circuit).

Another aspect of the invention is a variable power factor corrector that has a capacitor in parallel with a load on an AC line, and a line driven variable voltage output in series with the capacitor for varying the voltage to the capacitor, so as to vary the amount of capacitance reflected through the power controller onto the AC line. In corresponding manner, a line driven variable voltage output is employed in conjunction with other appropriate components to create variable resistors, tuned LC circuits, and variable inductors.

Preferred embodiments of the power factor corrector have the variable voltage output implemented in an electrical power controller, regulator, or converter, for regulating an AC input voltage. Preferred embodiments of such a controller have two pairs of switches, for a total of four switches, and an inductor, and the pairs of switches and the inductor are preferably in one of several conventional power regulator topologies such as buck, boost, or inverted (or some dual). The controller also has a logic controller as described above, so that each switch is separately modulated in such a way that some combination of one or more switches is always closed, or in other words so there is never a combination of all four switches that is open.

This embodiment may also be implemented in terms of a pair of bidirectional switches, where each bidirectional switch is comprised of a pair of unidirectional switches, for a total of four switches.

A preferred power factor corrector also has a current sensor in series with a load on the AC line. Both line voltage and current sense signals are fed into a phase delay detector that determines the phase delay between the AC line voltage and the load current. A power factor error amplifier is employed that is fed by an output of the phase delay detector, and the amplifier feeds a signal to the power controller logic controller, to automatically maintain a selected power factor correction on the line.

The power factor corrector may also advantageously employ a current sensor in series between the power controller and the load, and a harmonic error amplifier fed by an output of the current sensor, so that the amplifier feeds a signal to the power controller logic controller for auto resonance suppression and harmonic dampening.

In a variation of the power factor corrector, a plurality of capacitors and a plurality of power controllers are employed for variable and automatic power factor correction in a three phase AC system. In this variation, a first power controller is preferably in parallel between a first AC line and a third AC line, and a second power controller in parallel between a second AC line and a third AC line. At the same time, a first capacitor is preferably connected between the output of the first power controller and the third AC line, a second capacitor is connected between the output of the second power controller and the third AC line, and a third capacitor is connected between the output of the first power controller and the output of the second power controller.

Another variation of the power factor corrector employs a first power controller in parallel between a second AC line and a third AC line, with the power controller fed by a signal derived from a first AC line. A second power controller is in parallel between the first AC line and the second AC line, with the power controller fed by a signal derived from the third AC line. A third power controller is in parallel between the first AC line and the third AC line, with the power controller fed by a signal derived from the second AC line.

Another method aspect of the invention provides for power factor correction by reflecting or introducing an infinitely variable capacitance onto a power line to correct power factor, where the capacitance is variable by means of a voltage from the power line varied by a power control methodology.

This method preferably employs a power control methodology based on variable duty cycle modulation with the following steps: 1) sensing in real time a polarity of the input voltage to derive a pair of polarity signals that are inverted with respect to each other; 2) varying the duty cycle of a modulator, in accordance with and in proportion to the desired modification of the amplitude, the modulator having two outputs inverted with respect to each other; 3) feeding a polarity signal and a modulator output signal to an OR gate, where each signal has a duration, and the beginning of the duration of the duty cycle modulating output signal is delayed, and the end of the duration of the polarity signal is also delayed; 4) using the OR gate logical output for the variable duty cycle modulation of the input voltage.

A variation of this method employs, before reflecting or introducing a variable capacitance onto a power line, these additional steps: 1) sensing in real time an amplitude of current on the power line; 2) detecting phase delay (such as by calculating phase delay of current relative to voltage) on the power line in conjunction with the current sense; 3) amplifying an output of the phase delay detection step; then 4) controlling a power factor correction power controller with the amplified output from step 3.

Another variation of this method employs, before reflecting or introducing a variable capacitance onto a power line, these additional steps: 1) sensing in real time an amplitude of current on a line between the power controller and the power factor correction capacitor; 2) amplifying an output of the current sense step; 3) controlling a power factor correction power controller with the amplified output.

The method of the invention in one aspect involves electronic power control by varying the amplitude of an electrical power supply voltage, independent of frequency, whereby the output frequency will always be the same as the input frequency. An electrical circuit apparatus for accomplishing this function in a preferred embodiment is also disclosed herein. The preferred circuitry of this aspect of the invention uses four solid state switches, such as IGBT's, four diodes, an inductor, input and output filters and novel controlling circuitry. The controller apparatus and methods of the invention may be used to implement all otherwise conventional converter types, buck, boost, and inverting (and duals of these) versions to obtain different regulating characteristics, including galvanic isolation of the output from the input.

The inventive methods and devices may be used in power factor correction, voltage and/or current harmonic filtering and neutralization, line and load conditioning, improving or changing impedance characteristics of electrical generators, control of power transfer between two power grids, and programmable control of surges, sags, dropouts and most other voltage regulation problems.

In another aspect of the invention, a method of power factor correction is disclosed employing essentially the same control circuitry in a different application. In essence, a method as disclosed above, preferably employing the control circuitry referred to above, is used to dynamically control the voltage to (and therefore the reflected capacitance of) a single large capacitor (or several if one large enough is not available) in virtually infinite stages of adjustment with vastly fewer parts than previously thought possible, and all at correction speeds of under 1 second. The circuit can interface between the power line and a PFC capacitor, and/or reactor. As the duty cycle D is varied, the reflected capacitance onto the power line is:

$$C_{ref} = D^2 * C_{PFC}$$

Thus, the capacitor can be controlled infinitely between 0 and its given value, and the corrective load presented to the power line can be controlled infinitely between 0 and unity times the corrective load in direct connection to the line. If the power factor, or the phase delay, is measured, and fed into an appropriate error amplifier, such as will occur to those skilled in the art, then the control circuitry will automatically correct power factor, even approaching unity, with response time on the order of 0.1 seconds. No other method uses reflected capacitance via a variably controlled voltage source to achieve PFC.

The apparatus and method of the invention has no DC storage bank, unlike known converter and PFC correction devices, and only one device is actually conducting output current at any given moment. Furthermore, the turn off voltage varies with the instantaneous line voltage, and (for reactive loads) is at a maximum when output current is at a minimum. Thus, switching losses are dramatically lower than existing methods, and the power factor corrector disclosed has greater output capability and efficiency, and smaller size than known PFC methods.

The disclosed PFC method and apparatus can also be configured for three phase PFC for balanced loads by employing two units and three PFC capacitors. In another application, since the invention can vary reactive loads and impedances, it may also be used as a whole or part of a tunable circuit for line harmonic currents, with either manual or automatic tuning of the filter.

Yet another extension of the invention includes a relatively fast (several kilohertz or more) loop which is closed around either system (motor and PFC) current or device (invention) output (capacitor) current. The control circuitry can be made to reject and to some degree correct existing harmonic currents that arise from resonances in such systems. Power line harmonic currents are a widely recognized problem in electrical distribution systems.

This has great advantage over the common PFC technique where several different capacitors are switched in and out with thyristors or relays. The apparatus of the invention is simpler, smaller, cheaper, and more accurate, and more reliable. It also eliminates the system resonances associated with PFC capacitors.

This circuit has the advantage that each switch turns off only into the instantaneous input voltage. The voltage is clamped to that value by an appropriate freewheeling diode, as will be appreciated by those skilled in the art. In a nominal 240 VAC system, average turn off voltage in the circuit of the invention is about 220 V, compared to existing systems, such as those employing a DC rail, where a clamp value might be as much as 500 V, causing more than double the switching loss over the device of the invention. Thus the invention reduces switching losses to less than half of that common in known circuits, and with no clamp dissipation at all. A circuit with a snubber would require a capacitor so large that the snubber dissipation alone would be several times the total switching loss of the inventive device. The device of the invention reduces total switching losses dramatically over known devices, and this is particularly true while driving reactive loads, where peak line voltage and current are not in phase with each other. This phase separation normally leads to even higher losses in conventional devices. But since, as discussed above, switching loss is proportional to the product of frequency and voltage, this phase difference results in decreased switching losses in devices embodying the invention.

Those skilled in the art will appreciate that various known methods such as soft switching, resonant, quasi-resonant, and turn-off load line shaping, and so-called lossless snubbers, may be employed to reduce switching losses even further.

Further advantages are that reduced peak voltage results in lower EMI/RFI conducted to input and output; while reduced switching losses allow higher switching frequencies, saving size and weight in input and output filters. Another advantage is that any of several power device types may be successfully employed in the circuit, including bipolar, MOSFET, IGBT, GTO, and MCT devices. Topologies like those disclosed by others (Peterson, for example) are not so versatile. Because all four switches in devices embodying the invention are on briefly at zero crossing of the voltage waveform, the current can flow in either direction during that transition without initiating a high voltage spike on the switches during that period. The resulting circuit is quieter, smaller, more efficient, and more reliable than existing treatments. It can handle voltage and current in either direction for true four quadrant operation, with the small premium in extra control circuitry more than offset by savings in switch cost, heat sink size and weight, and mechanical size.

BRIEF DESCRIPTION OF THE DRAWINGS

FIG. 2. is a graphic representation of a voltage waveform output from a phase angle fired triac.

FIG. 3. is a graphic representation of an amplitude modulated sinusoidal voltage waveform output from devices embodying the invention.

FIG. 27. is a spreadsheet of comparative data on SCR performance vs. an invention prototype power controller.

BEST MODE OF CARRYING OUT THE INVENTION

Figure 1:
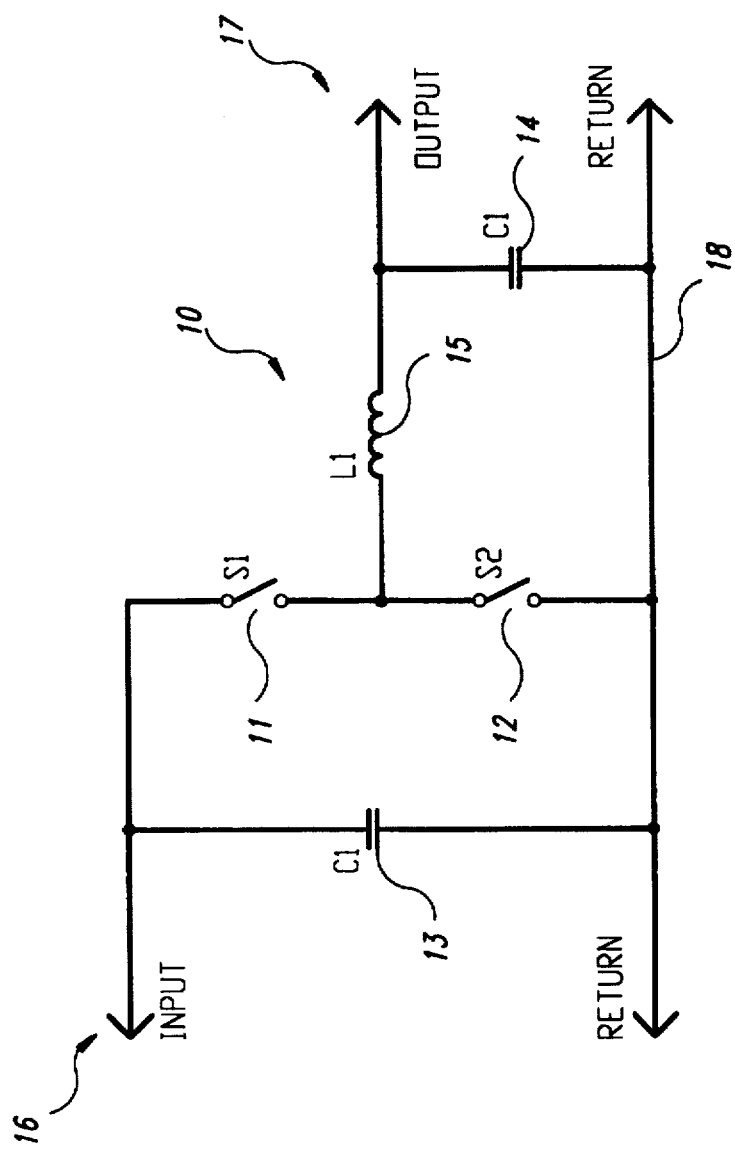
FIG. 1. is a schematic of a known simple buck regulator.

Turning now to the drawings, the invention will be described in a preferred embodiment by reference to the numerals of the drawing figures wherein like numbers indicate like parts.

FIG. 1 is a conventional configuration of known buck regulator topology, included here as a point of reference. Convention buck regulator 10 has a first switch 11, a second switch 12, input filter capacitor 13, output filter capacitor 14, inductor 15, input 16, output 17, and return 18. Switches 11 and 12 alternately close and open (are modulated), so that in conjunction with inductor 15, in well known fashion, voltage at output 17 may be stepped down from the voltage at input 16 in proportion to the duty cycle modulation of the switches.

FIG. 2 is a graphic representation of the broken waveform output from a phase angle fired triac, to be compared with FIG. 3 which is a graphic representation of an output voltage waveform having its amplitude varied over time by the power controller of the invention, without interruption of the waveform or change to the frequency. FIG. 2 is typical of phase controlled variable output voltage, in that step down of an instantaneous average voltage at output is achieved by cutting off a part of the waveform. This process results in many of the power regulation ills described elsewhere herein.

Figure 4:
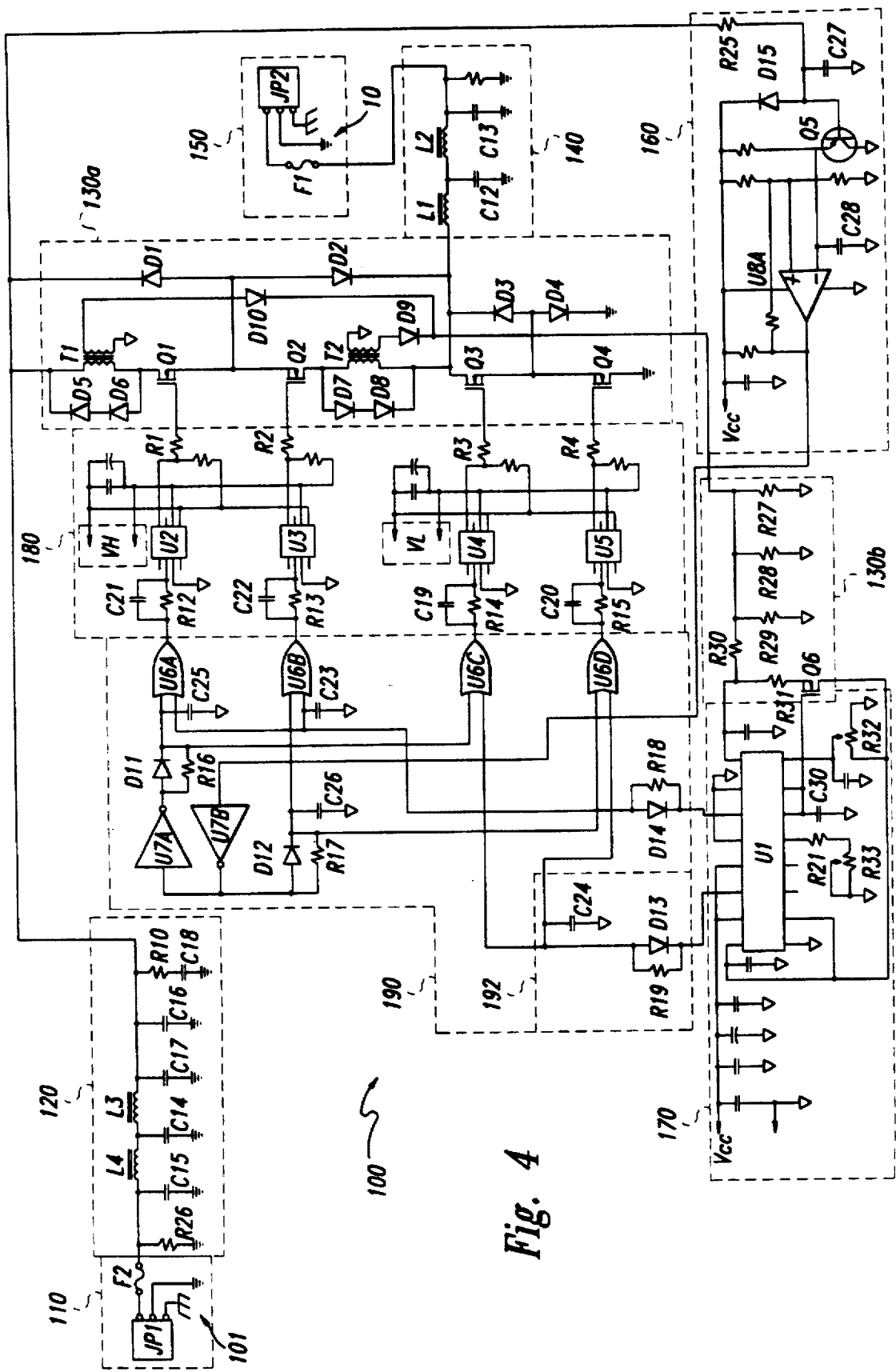
FIG. 4. is a schematic of one embodiment of the power controller of the invention.

FIG. 4 shows an electrical circuit for use in a preferred embodiment of the controller (sometimes also referred to herein as a converter or power converter) apparatus of the invention. The preferred circuitry of this aspect of the invention uses four IGBT solid state switches, four diodes, an inductor, input and output filters and novel controlling circuitry. The control circuitry is generally laid out in functional blocks in accordance with FIG. 5. The controller apparatus and methods of the invention may be used to implement all otherwise conventional converter types, including buck, boost, inverting, and flyback versions, as illustrated in FIG. 6a–d, and duals of these topologies, as shown in FIG. 7.

Figure 5:
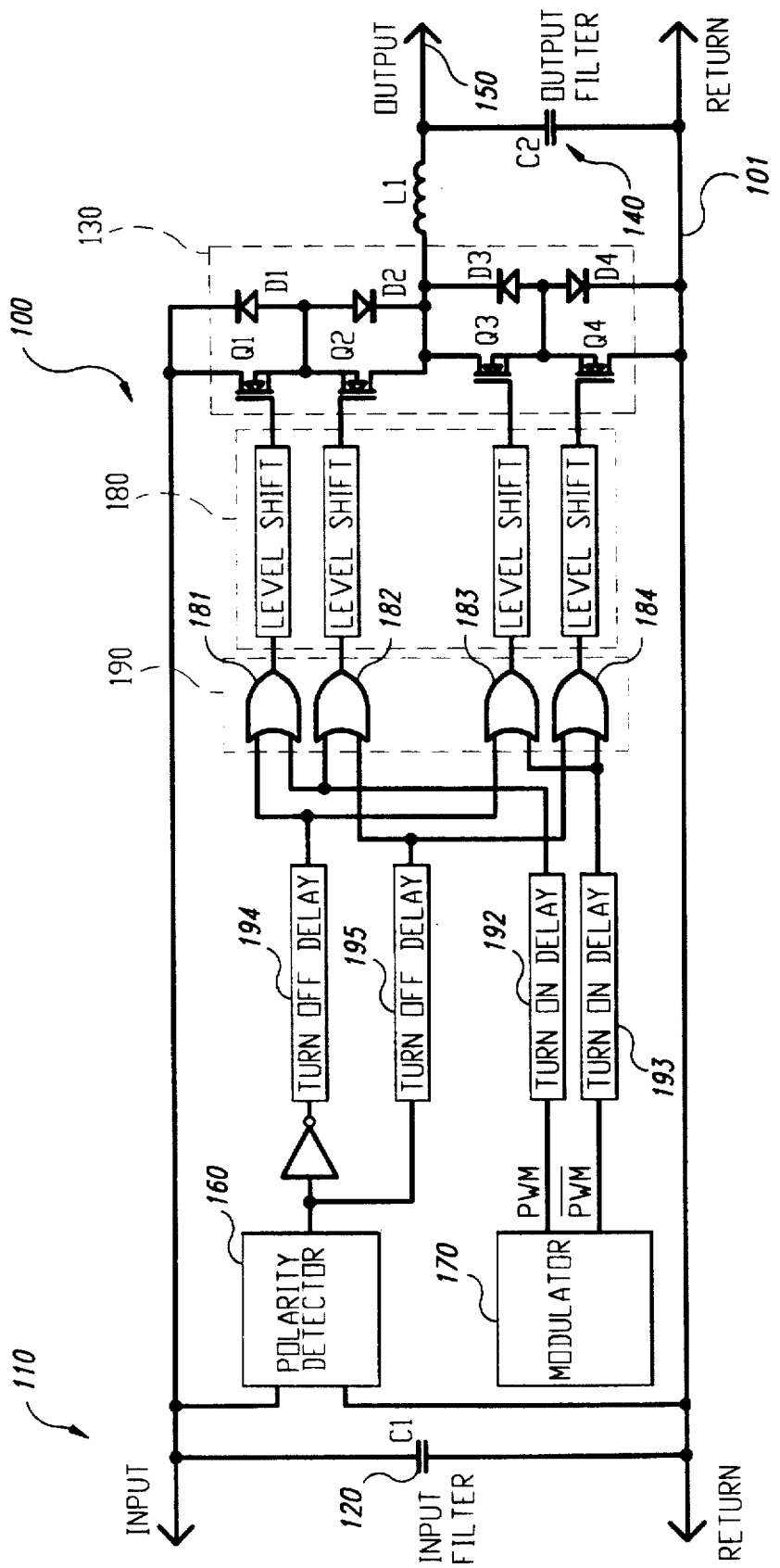
FIG. 5. is a block diagram and partial schematic of one embodiment of the power controller of the invention.

A preferred circuit for controlling power to reactive, resistive, or non-linear loads in accordance with FIGS. 5 or 4 would be comprised of at least four separately controlled unidirectional switches that are all modulated differently according to the polarity of the line voltage according to a logic "box" so that some combination of the four switches is always on, no matter what the polarity is, including the "zero cross" point of polarity change on the input voltage waveform. A preferred means of control in the "box" consists of a polarity detector, a modulator (preferably a pulse width modulator), and control logic.

Those skilled in the art will appreciate that the modulator may use any of several known methods, including fixed and variable frequency, and voltage and current mode, and can be implemented in one or more in a variety of ways, including use of one or more microcontrollers. Any of a number of algorithms can be employed to provide constant, varying, or programmable output (in terms of RMS, average and peak voltage and/or current) to control the modulator. The modulator preferably provides a high frequency (>10 Khz) logic output of between 0% and 100% duty cycle. An additional output of opposite or reciprocal polarity is also preferably provided.

During the "zero crossing" of the line voltage (i.e., when input voltage is in transition from one polarity to another), all switches are turned on simultaneously for a short period of time (it is contemplated that this will be on the order of a few microseconds in preferred embodiments) to allow continuous current to flow in the output, as may be necessary. Thus, current can flow in either direction during the zero crossing transition without initiating a high voltage spike on the switches at that time. During this time, the input and output of the circuit are effectively short circuited by the simultaneous conduction of the four switches. However, the transition is chosen to occur at a point where the instantaneous input voltage is low enough (near the "zero" crossing—i.e., in the range of +/–4 V, or less, depending on the power switches used) that little or no current is drawn from the input source.

Then each time the polarity has cycled, operation returns to that previously described. Thus there are four operational stages per line cycle: Positive polarity, polarity transition (zero cross), negative polarity, and polarity transition (zero cross). As the switches in preferred circuits are likely to operate at high and varying voltages, the control logic also includes level shifting as needed to interface with the switches.

The power controller 100 of the invention can best be appreciated in detail through a description of its basic schematic building blocks, as illustrated in a preferred circuit embodiment in FIG. 4. Input block 110 includes jumper JP1 through which power is applied to controller 100. JP1-2 is connected to a power return bus (as is line 2 of output connector JP2-2) and this bus is separate from chassis ground (JP1-3 and JP2-3). The common power return bus enables controller 100 to be portrayed (at least for purposes of block diagram form, such as for example FIG. 10) as a three terminal component. Input current limiting for catastrophic failure is provided by fuse F2.

Input filter 120 includes capacitors C14–C18, inductors L3 and L4, and resistor R10. This is a multistage filter which keeps high frequency switching noise out of the input line, reducing conducted EMI/RFI, as will be appreciated by those skilled in the art. R10 provides damping for the filter to reduce ringing. R26 is a bleeder resistor to remove stored charge from the input filter after power disconnection.

Power stage 130a–b consists of switches Q1–Q4 and diodes D1–D4. The switches are preferably implemented as IGBT type transistors, though they may also be any of several other types, as detailed elsewhere herein. Each of the four IGBT switches Q1–Q4 is separately controlled, though they form in combination a unique arrangement that, in conjunction with control circuitry disclosed herein, provides four quadrant operation (see discussion infra) and low switching losses.

In preferred embodiments, the four switches Q1–Q4 are paired, and each pair Q1–Q2 and Q3–Q4 have their sources tied together, and each of the switches in a pair are poled in the opposite sense to each other.

Output overcurrent protection is accomplished on a cycle by cycle basis via current transformers T1 and T2. Current sense information is rectified by diodes D9 and D10, and fed into sense resistors R27–R29 (block 130b), and then compared in the current limit pin U1-9 of modulator IC U1 (see infra). Switch Q6 and resistors R30 and R31 (block 130b) provide slope compensation to the current sense circuit in order to provide more stable operation under a variety of duty cycles. Diodes D5–D8 are used to limit transformer T1, T2 leakage reactance voltage spikes on switches Q1, Q2 during turn off.

Output filter 140 provides output averaging and filtering through inductors L1, L2 and capacitors C12, C13. L1 and C12 average the modulated power stage output into an instantaneous DC value (which varies over time, proportionate to input voltage and to duty cycle). L2 and C13 further filter out the high frequency switching waveform components from the output. Resistor R11 bleeds off charge from capacitors C12, C13 upon removal of input voltage.

Output block 150 includes output connector (jumper) JP-2, having output high side JP2-1 and power return JP2-2 (which as disclosed above is common with JP1-2). Long term output overcurrent protection is provided by fuse F1, while instantaneous limiting is provided for internally as previously discussed.

Polarity detector 160 serves to detect line polarity via comparator U8A and its associated circuitry. Input voltage is sensed through resistor R25 and clamped via diode D15 and switch Q5 to keep the signal within the common mode input range of comparator U8A. U8A detects voltage and provides a small amount of hysteresis (about 1V) to prevent spurious operation in a noisy environment. Some filtering is also provided via capacitors C27, C28 for the same purpose.

Modulator 170 includes IC U1 which provides for modulation in this embodiment of controller 100, using pulse width modulation as its particular method. However, those skilled in the art will appreciate that a number of other conventional controllers and other modulation types may also be employed as desired.

Modulator U1 is an off-the-shelf part used as a modulator/regulator for conventional switching power supplies, and its operation here is likewise conventional. Timing components R21, R33, and C30 are used to set operating frequency in the 20 KHz to 40 KHz range. Duty cycle is varied via resistor R32, which is connected to the soft start pin U1-8. There is no regulation loop shown in this particular circuit embodiment, although output voltage and current may be regulated in a variety of ways, including average, instantaneous, RMS, harmonic reduction and/or neutralization, power factor correction, and the like, all as discussed elsewhere herein. Modulator output is taken from U1-11 (normal) and U1-14 (inverted).

Level shifting may be accomplished by means of a variety of conventional methods involving transformers, optocouplers, and the like. In the preferred circuit shown in FIG. 4, the task is accomplished with a readily available integrated circuit (IC). This IC provides an optocoupler and high current driver for interfacing with the gate of a MOSFET or IGBT device. Electrical power at the gate is provided via an isolated transformer winding with rectifier and filter, although a number of equivalent methods may be alternately employed by those skilled in the art.

Level shifting block 180 receives output signals from the logic circuitry (q.v., infra), which are then shifted in voltage level to drive switches Q1-Q4 via ICs U2-U5, respectively. U2-U5 are stock components that include an optocoupler input and high current MOSFET driver output. They operate from small power supplies VH and VL which are 15 VDC floating power sources, the conventional derivation of which will readily occur to those skilled in the art. In this case, small linear power supplies are used but are not shown in the schematic for sake of clarity.

Each transistor gate has a series resistor (R1–R4) to limit ringing and to control rise and fall times during switching transitions. Each transistor also has a bleeder resistor from gate to source to insure that all devices are in the non-conducting or "off" state in the event that VH or VL are lost. Current into each optocoupler input is limited by a 1.21K resistor (R12–R15) to about 7 mA per the TC4804 specification, with a small capacitor (C19–C22) in parallel to speed up the response time.

Control logic block 190 includes IC devices U7A, U7B and U6A–D. Operation of control logic block 190 may best be understood from discussion of its three basic modes of operation. In all modes, control logic 190 takes three input signal types (normal modulated output—from U1-11, inverted modulated output—from U1-14, and polarity detect—from U8A-1) and translates them into four individual transistor drive outputs, which in turn control Q1–Q4. It is thus useful to discuss the invention in terms of three modes, corresponding as they do to the three types of input signals received by the control logic unit. This not negate however the earlier discussion based on four operational stages, corresponding to the four parts of a voltage waveform as it moves in time. For each of the three basic operating modes there are two conditions (discussion of which also sets forth the essence of the full four quadrant operation of the apparatus and method of the invention).

First mode is positive polarity of input voltage. During positive input polarity, U8A will be low, holding inverters U7B (output) high and U7A (output) low. With U7B high, both OR gates U6B and U6D will be high, turning on Q2 via U3 and Q4 via U5. With U7A low, U6A is controlled by the modulator output from U1-11. A turn on delay (rising edge) is provided by R18 and C23. Turn off is not delayed because diode D14 bypasses R18 on the falling edge. U6A in turn controls Q1 via U2.

At the same time, U7A low allows U6C to be controlled by the inverted modulator output U1-14. It contains a similar turn on delay circuit comprised of R19, C24 and D13. Both delay times are the same and are sufficient to prevent Q1 and Q3 from conducting simultaneously during operation. U6C controls Q3 via U4.

The two conditions of operation for positive polarity are 1) positive output current, and 2) negative output current. During positive output current, L1 current is sourced through Q1 and D2 during the Q1 "on" (conducting) state. When Q1 is turned off, L1 current freewheels through Q4 and D3. Q3 is turned on (after delay) during the time that Q1 is off, but no current flows through it due to its polarity; the current passes through D3 instead.

During negative output current, L1 current is controlled by Q3, passing through Q3 and D4. When Q3 is turned off, L1 current freewheels through Q2 and D1 back to the input. Q1 is turned on during that time, but no current flows through it due to its polarity; current passes through D1 instead.

The second mode is negative polarity of input voltage. During negative input polarity, U8A will be high, holding inverters U7B (output) low and U7A (output) high. With U7A high, both OR gates U6A and U6C will be high, turning on Q1 via U2 and Q3 via U4. With U7B low, U6B is controlled by the modulator output from U1-11. A turn on delay (rising edge) is provided by R18 and C23. Turn off is not delayed because diode D14 bypasses R18 on the falling edge. U6B in turn controls Q2 via U3.

At the same time, U7B low allows U6D to be controlled by the inverted modulator output U1-14. It contains a similar turn on delay circuit 192 comprised of R19, C24 and D13. Both delay times are the same and are sufficient to prevent Q2 and Q4 from conducting simultaneously during operation. U6D controls Q4 via U5.

The two conditions of operation for negative polarity are 1) negative output current, and 2) positive output current. During negative output current, L1 current is controlled through Q2 and D1 during the Q2 "on" state. When Q2 is turned off, L1 current freewheeels through Q3 and D4. Q4 is turned on (after delay) during the time that Q2 is off, but no current flows through it due to its polarity; the current passes through D4 instead.

During positive output current, L1 current is controlled by Q4, passing through Q4 and D3. When Q4 is turned off, L1 current freewheels through Q1 and D2 back from the input. Q2 is turned on during that time, but no current flows through it due to its polarity; current passes through D2 instead.

The third mode is polarity transition, with the two conditions being positive transition and negative transition. During positive transition (from negative polarity to positive polarity), Q2 and Q4 are turned on at transition according to the previously described comparator and logic states. Q1 and Q3 had been turned on during negative polarity, as explained above, and do not now turn off immediately at this transition because of a delay circuit formed by resistor R16 and capacitor C25. Diode D11 prevents any turn on delay during this transition.

During negative transition (from positive polarity to negative polarity), Q1 and Q3 are turned on at transition according to the previously described comparator and logic states. Q2 and Q4 had been turned on during positive polarity, as explained above, and do not now turn off immediately at this transition because of a delay circuit formed by resistor R17 and capacitor C26. Diode D12 prevents any turn on delay during this transition.

In preferred embodiments the turn on delay is comprised of a circuit wherein a high input transition creates a high output transition after some predetermined delay, and a low input transition results in an immediate (i.e., minimum delay) low output transition. This is all preferably accomplished with a diode, resistor and capacitor combination, such that on a low-to-high transition, the capacitor is charged high through the resistor, taking an amount of time to reach the logic threshold voltage of the OR gate being driven, thus providing a delay, the amount of which may be selected through selection of the values of the diode, resistor and capacitor referred to above, as will be appreciated by those skilled in the art. Then, on a high-to-low transition, the resistor is bypassed by the diode creating a low impedance discharge path to greatly increase the discharge rate of the capacitor. The capacitor voltage is thus lowered in minimum time, and the logic transition thus occurs with minimum delay.

In preferred embodiments the turn off delay is comprised of a circuit wherein a low input transition creates a low output transition after some predetermined delay, and a high input transition results in an immediate (i.e., minimum delay) high output transition. This is also all preferably accomplished with a diode, resistor and capacitor combination, such that on a high-to-low transition, the capacitor is discharged low through the resistor, taking an amount of time to reach the logic threshold voltage of the OR gate being driven, thus providing a delay, the amount of which also may be selected through selection of the values of the diode, resistor and capacitor referred to above. Then, on a low-to-high transition, the resistor is bypassed by the diode creating a low impedance charge path to greatly increase the charge rate of the capacitor. The capacitor voltage is thus raised in minimum time, and the logic transition thus occurs with minimum delay. For either or both of the turn off and turn on delay methods disclosed, a number of alternate methodologies may be used to create the respective delays, such as use of monostable multivibrators, counters, microcontrollers, and the like, all as will be appreciated by those skilled in the art.

As a result of this logic, for either positive or negative transition, the input voltage and output voltage are momentarily clamped and are likewise momentarily effectively short circuited to the input/output return and to each other. However, though this runs contrary to conventional thinking, the transition logic events described above all occur at a point in the input voltage waveform where the absolute value of the instantaneous input voltage is actually less than the total semiconductor voltage drops between the input voltage and the input/output voltage return (i.e., less than about four volts in the circuit illustrated). For this reason, no excessive current inputs are drawn during transition. Output voltage is held at a minimum voltage, proportionate to the input voltage, as it should be. L1 current freewheels appropriately, and no excessive voltage spikes occur on either the input, the output, or across any of the transistors or diodes in power stage 130.

After turn off delay, transition is complete, and operation returns to either positive or negative polarity mode, as appropriate, and as discussed above. Overall control logic and operation of controller 100 is therefore fully defined, logically controlled at all times, and smooth in transition for all modes and conditions.

In the circuit illustrated in FIG. 4, preferred component values and/or part types are given in the table below. This list, in conjunction with the schematic and other disclosure herein, will enable the technician or other skilled artisan to construct the circuit disclosed.

| Drawing Numerals | PartType |
| --- | --- |
| C1–C8 | .1 UF |
| R30 | 1.00K |
| R12–R15 | 1.21K |
| D11–D15 | 1N4448 |
| Q5 | 2N3906 |
| Q6 | 2N7000 |
| C13–C15 | 2 UF 400 V |
| R5–R9 | 4.99K |
| R10 | 5.1 10 W |
| C12, C16–C18 | 5 UF 400 V |
| R31 | 6.21K |
| R1–R4, R27–R29 | 10.0 |
| R16–R21 | 10.0K |
| R32 | 10K |
| R33 | 20K |
| F1, F2 | 25A |
| L4 | 30 UH |
| C27 | 47 PF |
| L2, L3 | 50 UH |
| R11, R25, R26 | 82K 2 W |
| R22 | 90.9K |
| R24 | 100K |
| C19–C26 | 100 PF |
| C9–C11 | 100 UF |
| C28, C29 | 220 PF |
| L1 | 240 UH |
| R23 | 453K |
| C30 | 4700 PF |
| U7 | CD4049UB |
| U6 | CD4071B |
| D9, D10 | HER105 |
| D5–D8 | HER305 |
| D1–D4 | HFA25BP60 |
| JP1 | INPUT |
| Q1–Q4 | IRGPC50U |
| U8 | LM393A |
| JP2 | OUTPUT |
| T1, T2 | PE51687 |
| U2–U5 | TC4804 |
| U1 | UC3824 |

The functional blocks discussed above with reference to FIG. 4 can be further understood now by reference to FIG. 5. Power controller 100 (also sometimes referred to herein as a converter) has four OR gates 181–184 in logic control unit 190 fed by outputs from polarity detector 160 and duty cycle modulator 170 through turn off delays 194, 195 and turn on delays 192, 193 such that OR gates 181, 183 each receive as a first input an output from the polarity detector 160 (inverted) through delay 194, and OR gates 182, 184 each receive as a first input an output from the polarity detector 160 through delay 195. OR gates 181, 182 each receive as a second input an output from the duty cycle modulator 170 through delay 192, and OR gates 183, 184 each receive as a second input an output from the duty cycle modulator 170 through delay 193. The output from each OR gate, through appropriate level shifting in level shift block 180, controls or drives one of four switches Q1–Q4 in power stage 130 (through its respective gate) each.

Figure 9:
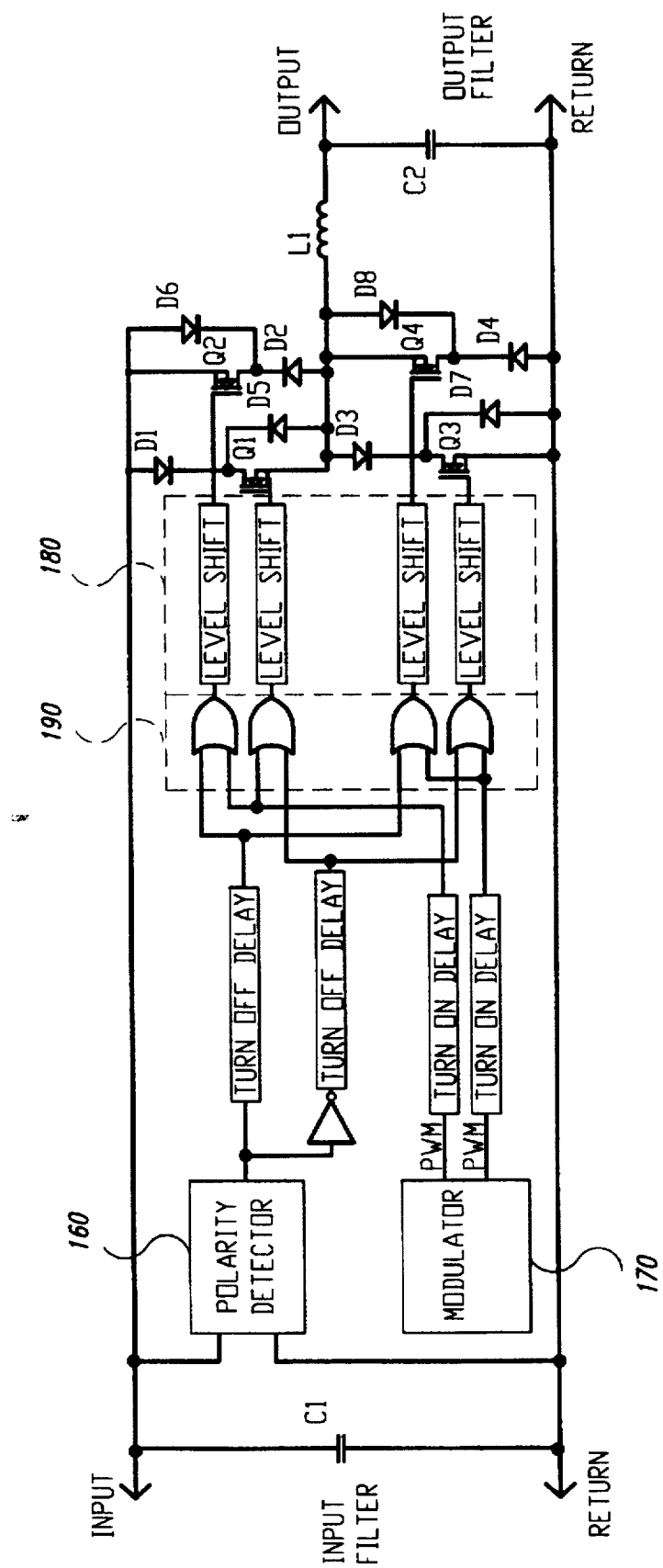
FIG. 9. is a block diagram and partial schematic of an alternate embodiment of the power controller of the invention.

Preferably, the switch sources of each pair of switches are tied together, as illustrated in this drawing figure, but do not have to be in some alternate embodiments, such as that shown in FIG. 9. Preferably, each switch is a solid state switching device, with a diode, poled to have a sense opposite to the switch, in parallel across the source and drain of the switch, and with the diodes of a pair of such switches opposite in sense to each other, as illustrated. The switches are preferably transistors, such as the IGBT transistors illustrated for Q1–Q4.

This embodiment of controller 100 has a buck regulator type of typology, but has two switches in series with each other, preferably poled in the opposite sense from each other, and connected with inductor L1 to input 110, and two switches in series with each other, also preferably poled in the opposite sense from each other, and connected with inductor L1 to return 101.

Figure 6A:
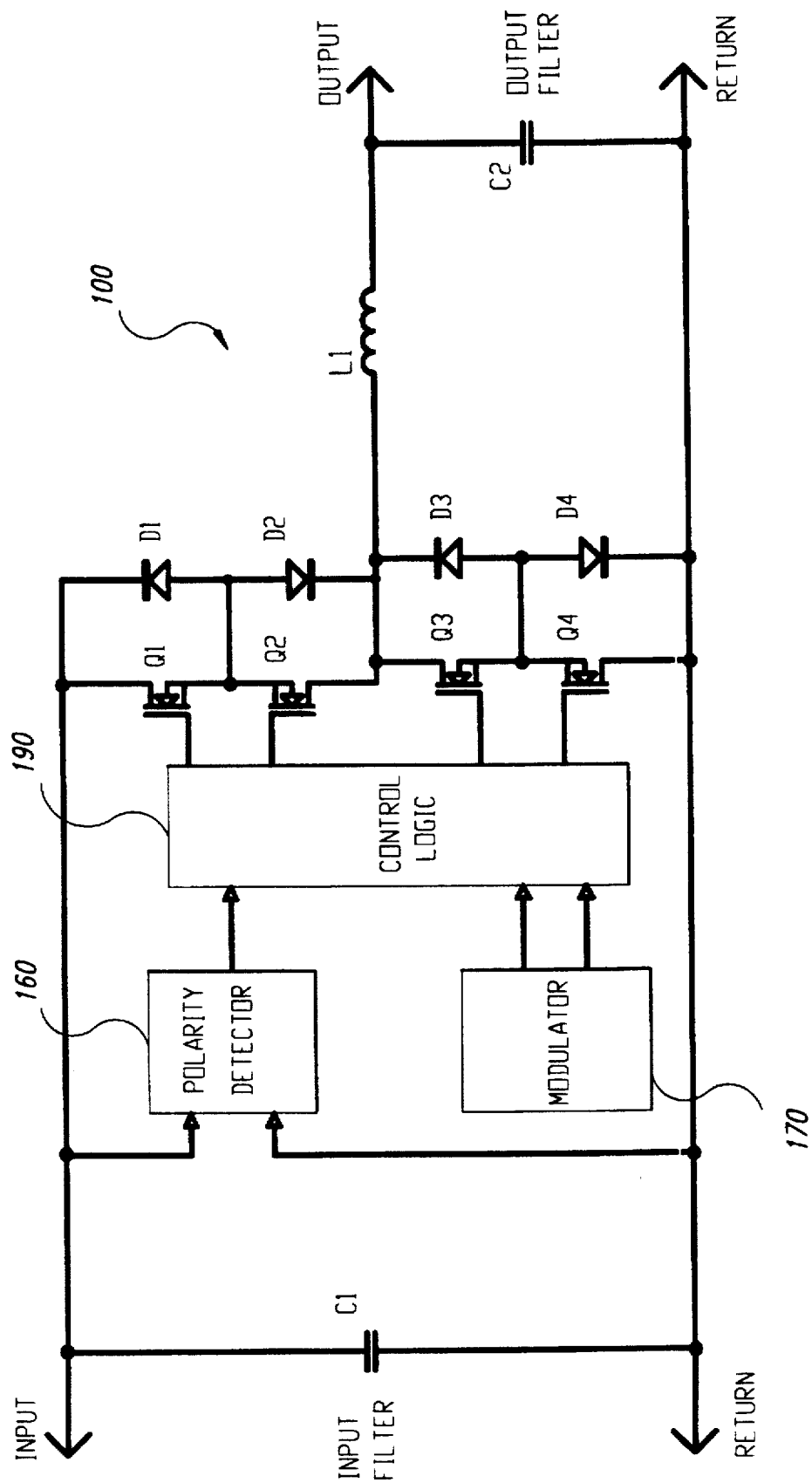
FIG. 6. is a set a–d of schematic and partial block diagrams of alternate embodiments of the power controller of the invention.
Figure 6B:
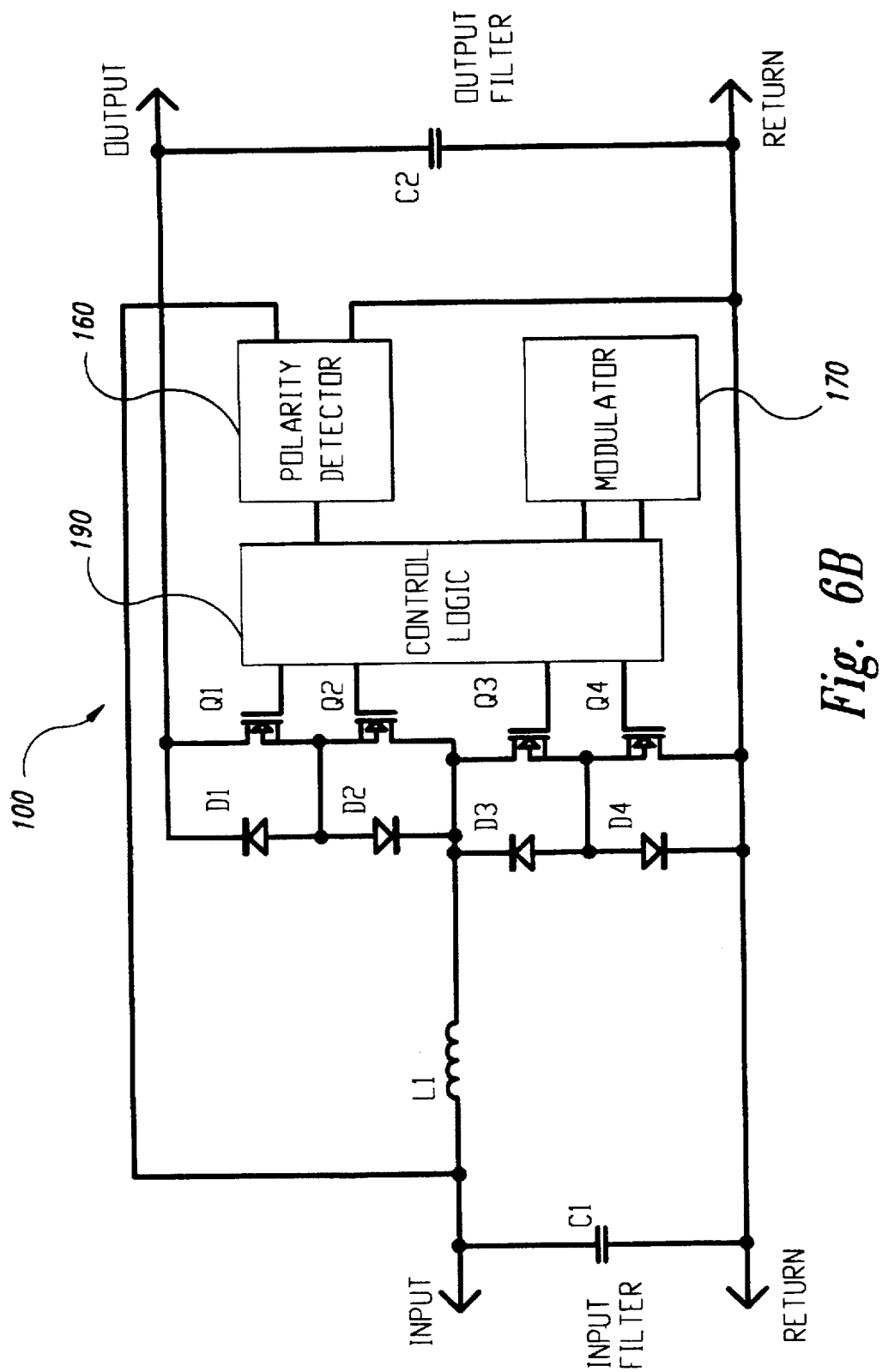
Figure 6C:
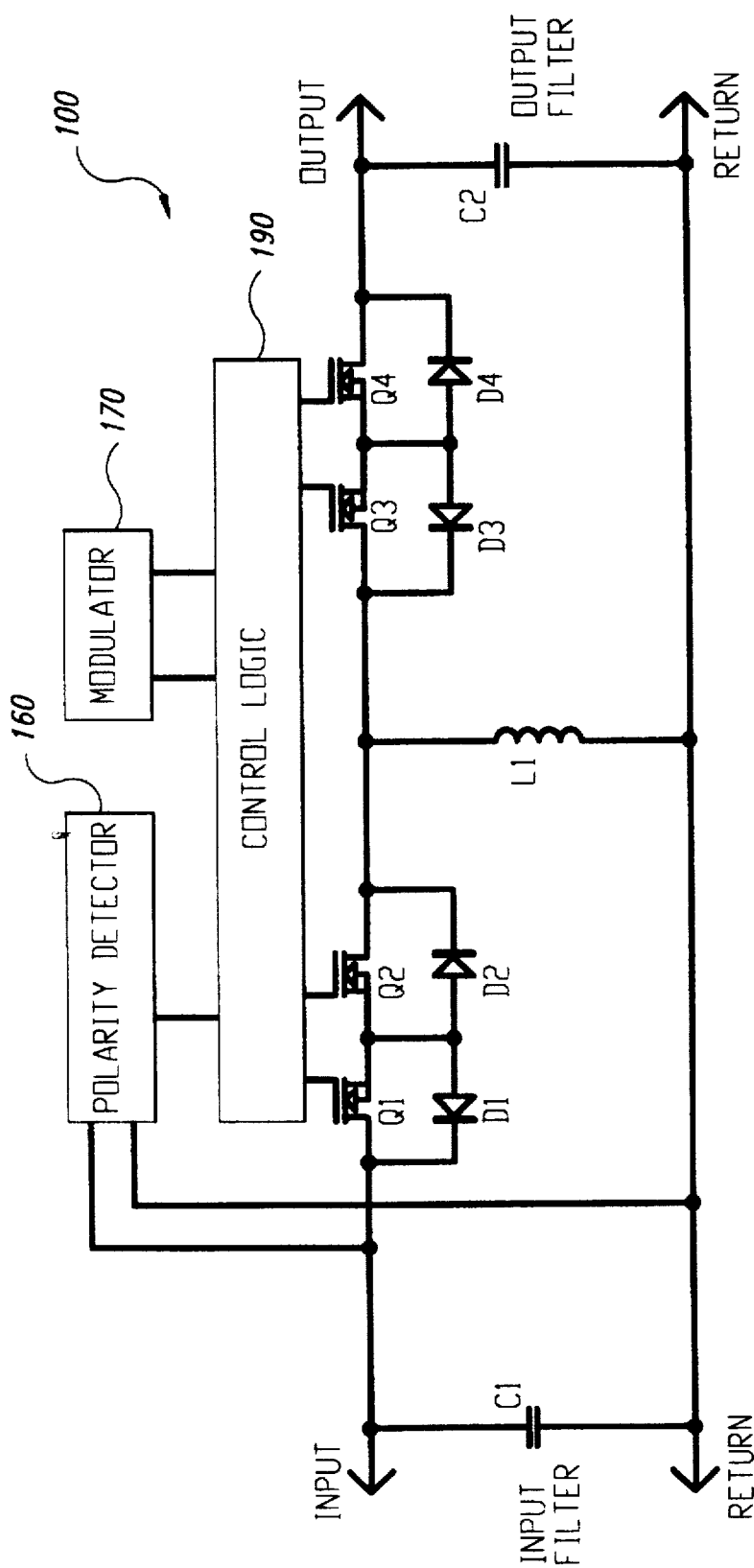
Figure 6D:
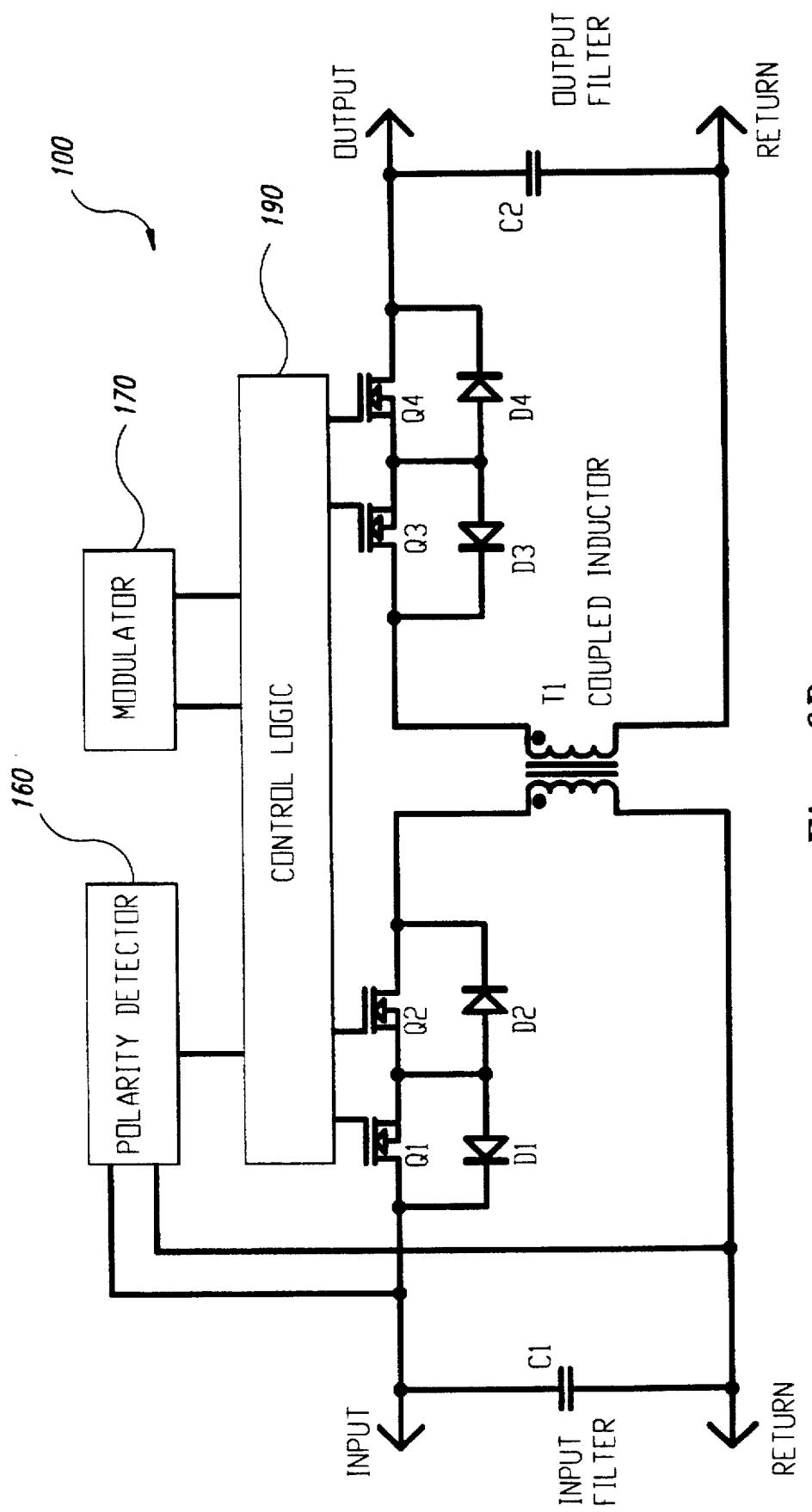
Figure 7A:
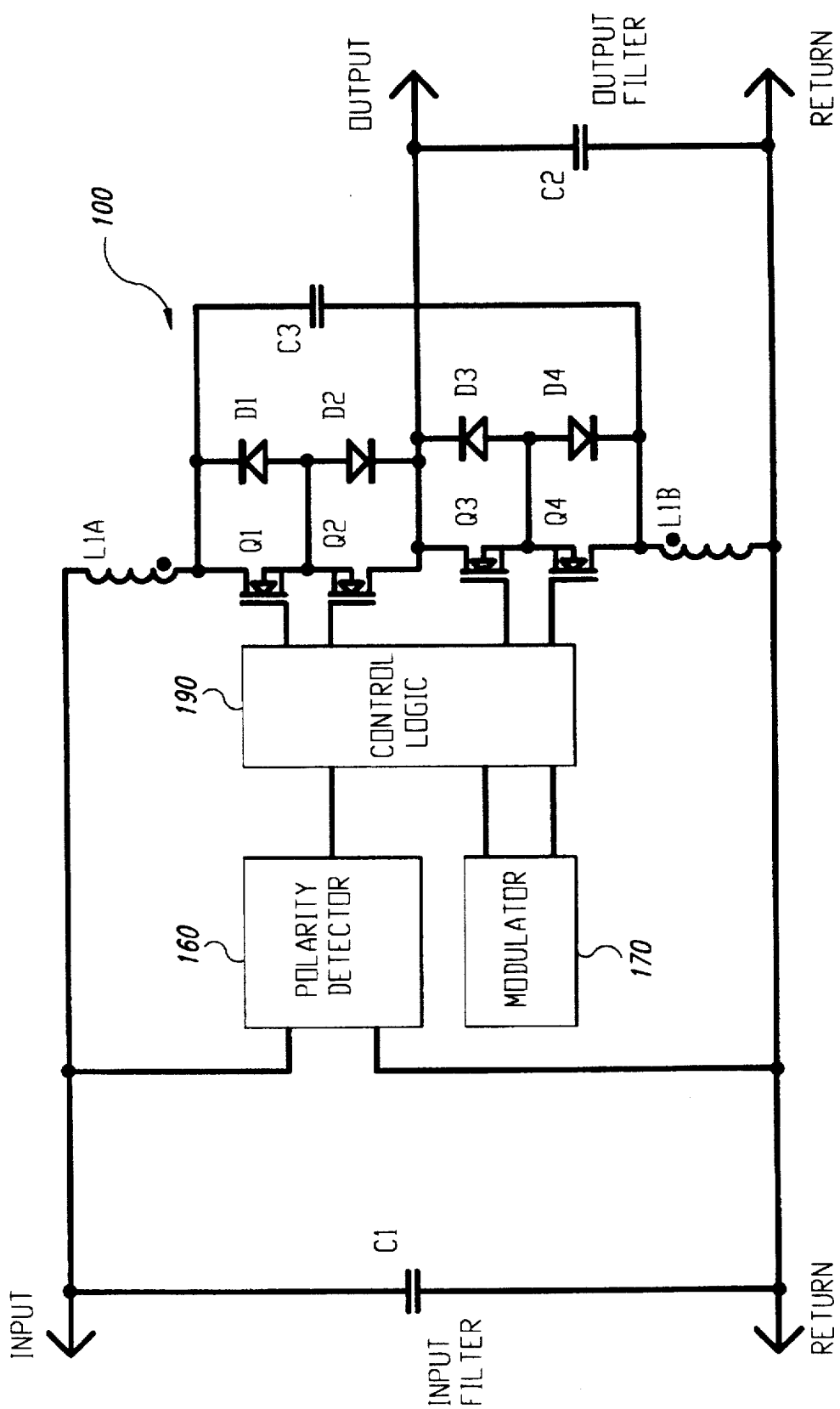
FIG. 7. is a block diagram and partial schematic of alternate dual topologies.
Figure 7B:
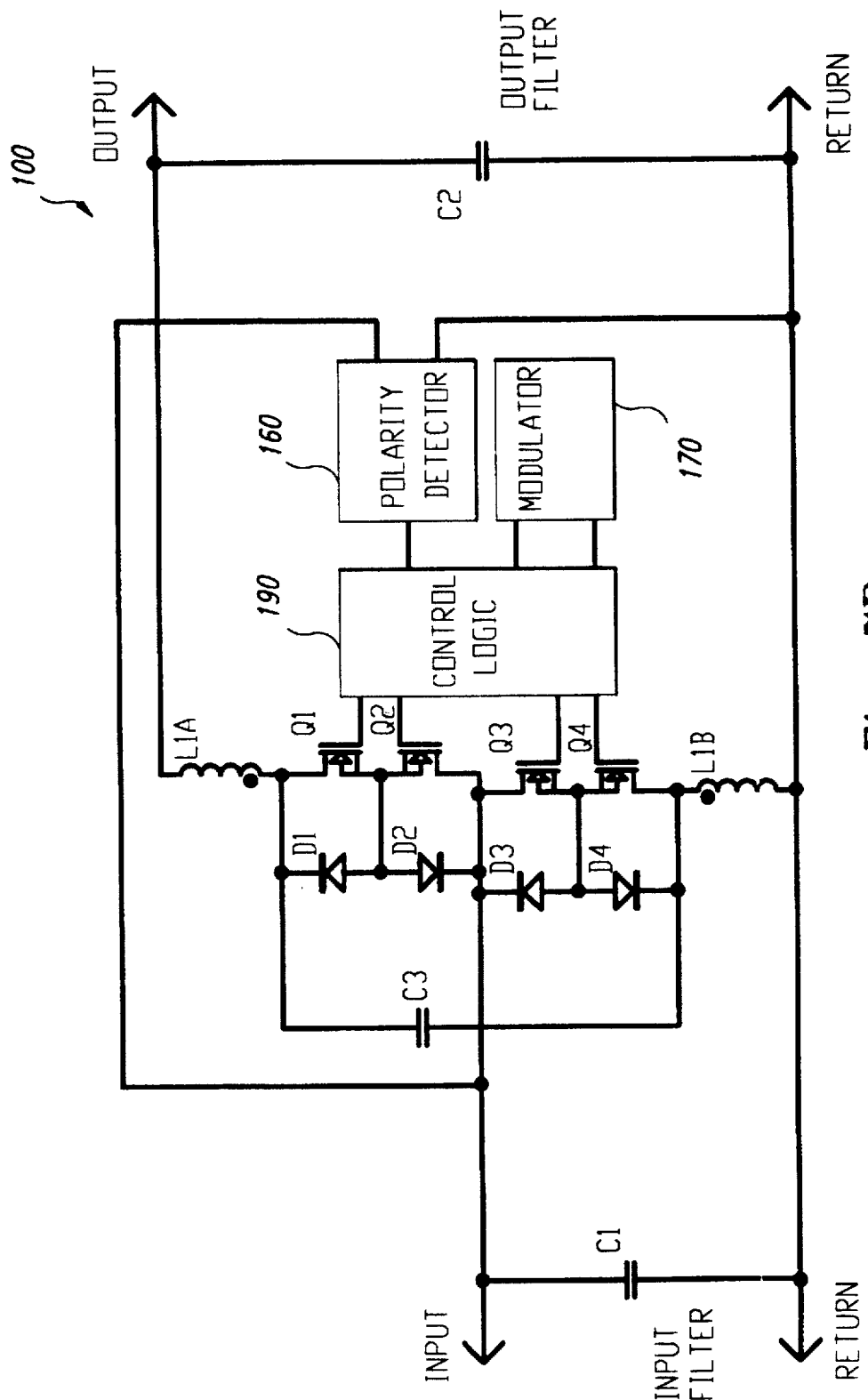
Figure 7C:
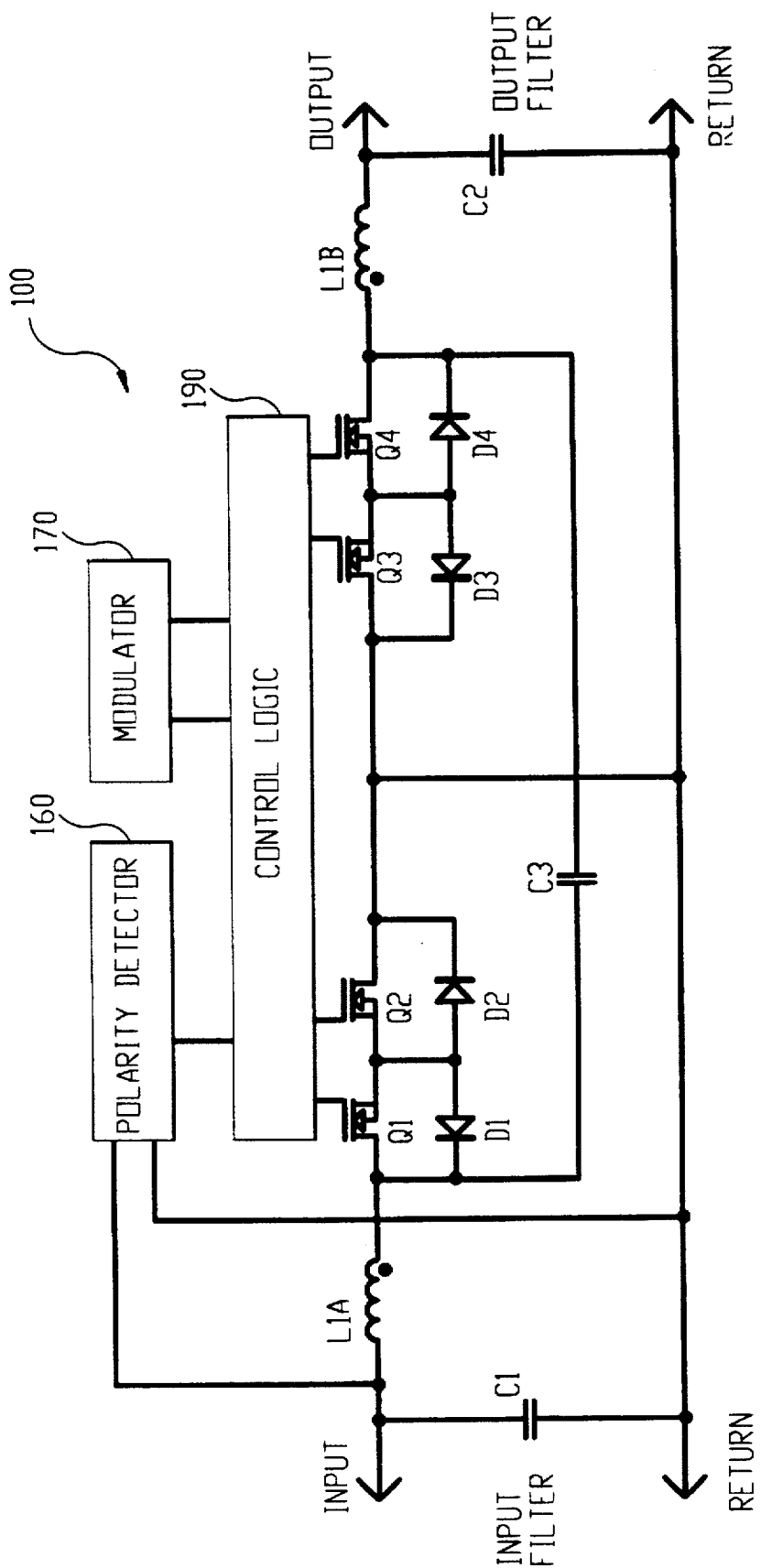
Figure 7D:
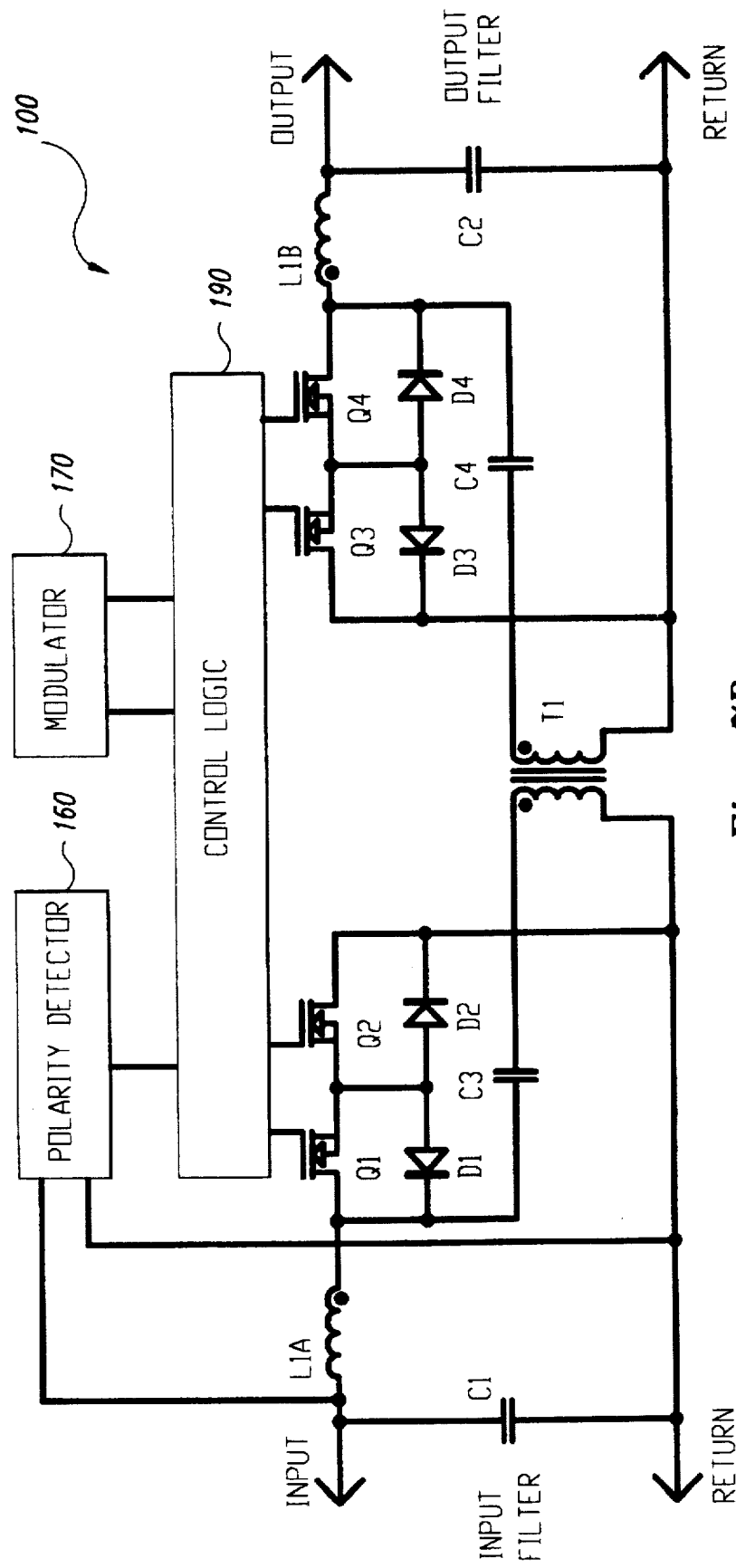

The buck regulator general form of controller 100 in FIG. 5, can better be seen in FIG. 6a, along with other conventional regulator type configurations for controller 100. FIG. 6b shows controller 100 in step-up or boost configuration. FIG. 6c shows controller 100 in inverting regulator configuration. FIG. 6d shows controller 100 in isolated or flyback configuration.

As a further illustration of the versatility of the invention, and its potential for replacing conventional topologies without their disadvantages, FIG. 7 shows the corresponding "dual" transforms for each of the four topologies shown in FIG. 6. FIG. 7a shows controller 100 in step-down or buck dual configuration. FIG. 7b shows controller 100 in step-up or boost dual configuration. FIG. 7c shows controller 100 in inverting regulator dual configuration. FIG. 7d shows controller 100 in isolated inverting dual configuration.

The resulting output controller 100 voltage under any input voltage mode or output current condition is equal to the product of the input voltage and the modulator duty cycle, as more fully discussed elsewhere herein. Slight deviations do exist, due to turn on delay times and semiconductor and resistive voltage drops, as will be appreciated by those skilled in the art, but the overall waveform purity is excellent in the disclosed circuit, especially at higher voltages (such as 230 VAC and up).

The controller or converter apparatus and method of the invention is envisioned for use in a wide range of applications via a range of alternate topologies disclosed herein. For instance, it is envisioned that control modules comprising the apparatus or methodology of the invention can be made for manual usage, power factor correction and automatic power factor correction, as a universal line conditioner, a motor economizer, and as a harmonic neutralizer. Other uses include parallel mode current sharing and echelon Ion works, and for closed loop 10 bit digital modules and industrial interfaces in the 4–20 mA range, this latter module suitable for use with a number of standard control interfaces, such as RS232, RS485, IEEE488.2, VXI, 0–10 V, 0–5 V, +/–10 V, +/–5 V, and manual. Power converters envisioned can be made for use in a wide range of operating voltages and currents, from for instance 120 VAC, 1.5 KVA to 600 VAC, 200 OKVA; and even beyond this range, higher amperages can be accommodated by paralleling two or more of the converter modules of the invention, and higher voltages may be controlled via a controller/transformer hybrid.

Figure 8:
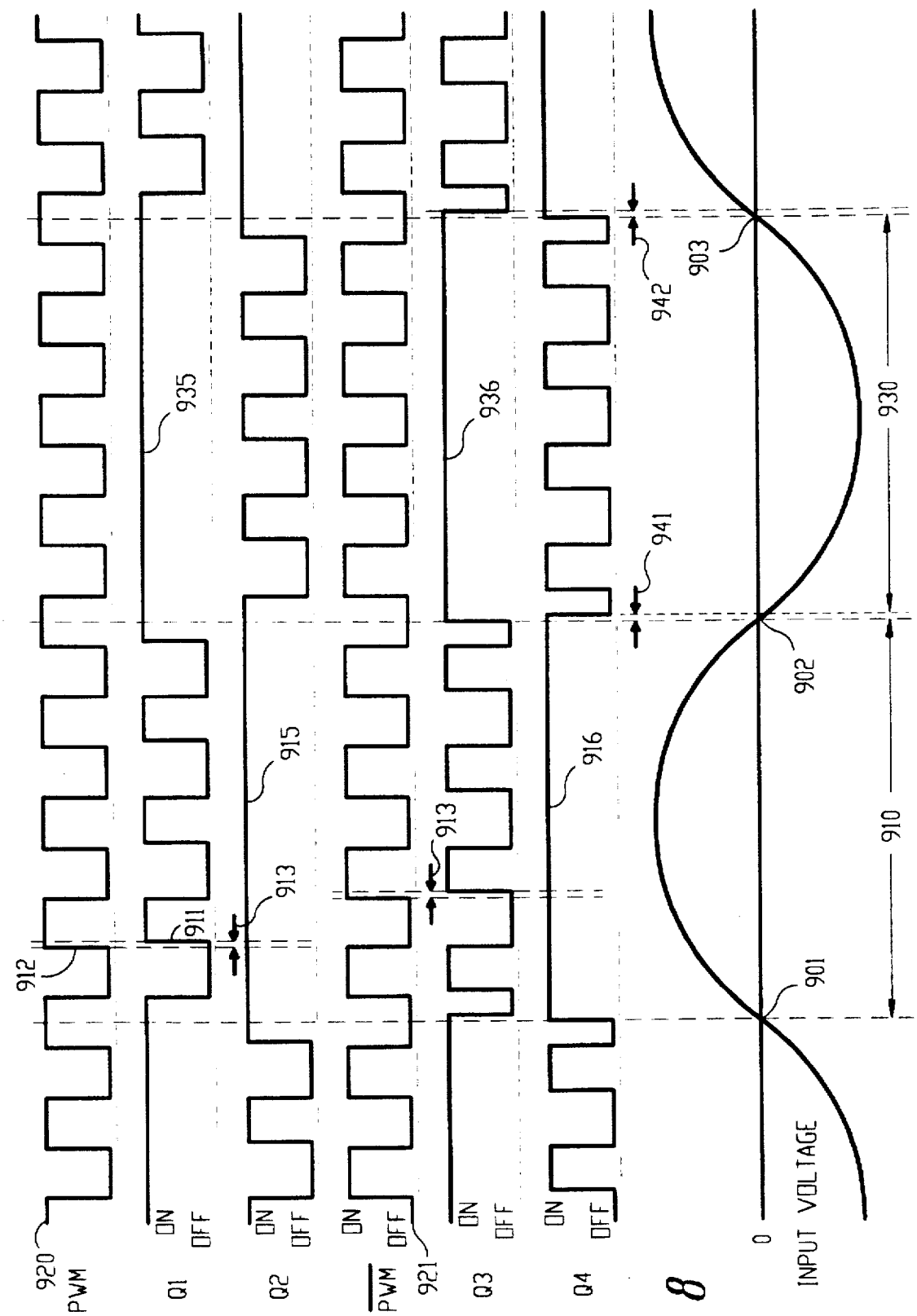
FIG. 8. is a switch timing diagram for operation of the circuit of FIG. 4.

In the preferred method of the invention, with all four preferably transistor switches separately controlled, and modulated differently according to the polarity of the input voltage, a sequence can be implemented whereby each switch turns off only into the instantaneous line input voltage, as graphically represented in the timing diagram of FIG. 8. In FIG. 8, an idealized line voltage is shown schematically as a sine wave with representative cross over points 901, 902, 903 (the points where the waveform line crosses the "zero crossing" line, emphasized by vertical dashed lines, and corresponding to the point in time where the waveform shifts from one polarity to the other). A pulse width modulation (PWM) signal 920, capable of ranging between 0% and 100% (and here illustrated at about 50%), and its "anti-modulated" reciprocal 921, are fed into a logic network, such as has been described herein, along with the output from a line polarity detector.

When line voltage (polarity) is positive (time duration 910), switch Q1 is pulse width modulated (on and off), each "on" time 911 slightly delayed relative to the corresponding rising edge 912 of the PWM, and in like manner, Q3 is anti-modulated (i.e. the opposite state of Q1, or in other words, when Q1 is on, Q3 is off, and vice-versa). A small delay or dead time 913 is added for each turn-on of each switch (emphasized with dotted lines) to avoid simultaneous conduction, where the amount of time will depend on the characteristics of the particular switch employed, all as will be appreciated by those skilled in the art. Q2 and Q4 remain on 915, 916 at all times during this positive polarity operational phase.

When line voltage polarity is negative (time duration 930), Q2 is pulse width modulated and Q4 is anti-modulated (i.e. the opposite state of Q2). Again, a small delay 913 (present, but not emphasized with dotted lines) or dead time is added for the turn-on of each switch to avoid simultaneous conduction, and Q1 and Q3 remain on 935, 936 at all times during this negative polarity operational phase.

At crossover 902, 903, Q3 turn off delay 941 and Q4 turn off delay 942 (emphasized with dotted lines) assure that at least one switch (preferably all switches, as here illustrated) remains on, or conducting. Preferably, all switches are turned on simultaneously at this zero cross for a short period of time (on the order of a few microseconds) to allow continuous current to flow in either direction during zero crossing transition without initiating voltage spikes on any of the switches at that time, as more fully disclosed elsewhere herein. This may be summarized in the following table.

| INPUT POLARITY | Q1 | SWITCH Q2 | STATES Q3 | Q4 |
|---|---|---|---|---|
| POSITIVE | MODULATE | ON | MODULATE | ON |
| NEGATIVE | ON | MODU- | ON | MODU- |

| INPUT POLARITY | Q1 | SWITCH STATES Q2 | Q3 | Q4 |
|---|---|---|---|---|
| LATE TRANSITION | ON | LATE ON | ON | LATE $\overline{ON}$ |

Note: "MODULATE" is opposite of "MODULATE"

FIG. 9 illustrates an alternate embodiment of the power converter of the invention. It is particularly well adapted for higher power (100 A and up) applications. It is in most respects the same as that shown in FIG. 5, except for the arrangement of switches Q1–Q4, and a different switch diode arrangement. Q1–Q4 are independently controlled as before (logical control direct to the gate of each switch, no two gates tied together or receiving control from the same logical controller element), but the switch sources of respective switch pairs (i.e. Q1–Q2) are not directly tied together, as they are in the embodiment in FIG. 5. Diodes D1–D4 are also differently placed, rather than simply connected across source and drain of their respective switches. Additional diodes D5–D8 are relatively small and inexpensive, and added to the design to help bypass the switches as they turn off, but are not necessary when MOSFET switches are used (instead of the preferred IGBT's.

In a power factor correction application, the converter circuit of the invention can interface between the power line and a PFC capacitor, and/or reactor. If the power factor, or the phase delay, on the line is measured, and then fed into an appropriate error amplifier, of such design as will be readily available to those skilled in the art, then the power controller with its control circuitry will automatically correct power factor on the line, even approaching unity PF, and with response time on the order of 0.1 seconds.

Figure 10:
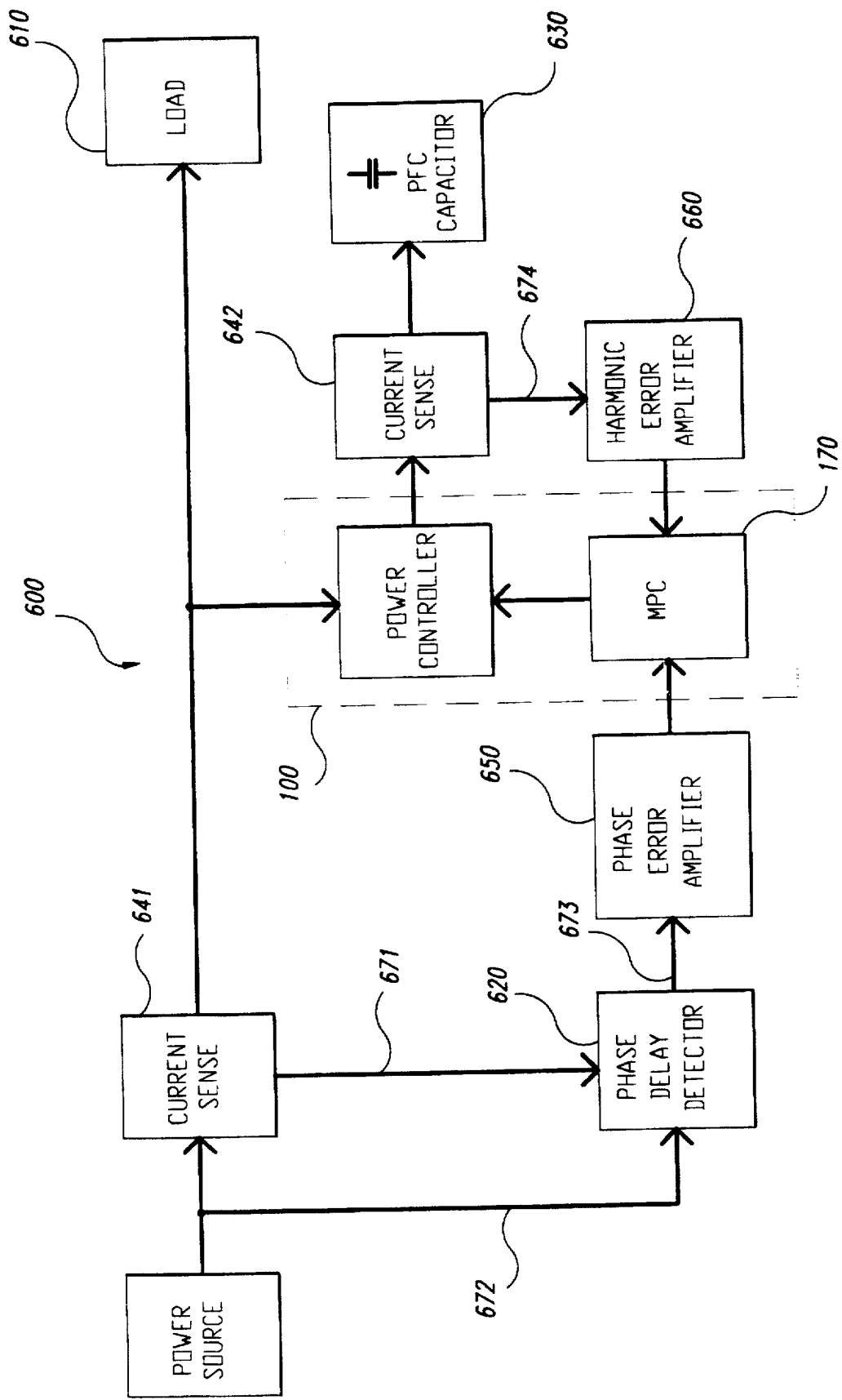
FIG. 10. is a block diagram of an autovariable power factor corrector.

FIG. 10 shows such an automatic variable power factor corrector 600, having a power controller 100 and power factor correction capacitor(s) 630 and control circuitry. This topology is well adapted for correcting lagging power factor due to use of motors and transformers on the line.

Operation of automatic PF corrector 600 is based upon the variable addition of leading power factor loads to cancel out the lagging currents. This is accomplished by varying controller 100 output into PFC capacitor(s) 630, so that the varying output voltage in turn varies output current into capacitor 630, so that a variable capacitance is reflected back into the power line. Automatic correction is achieved by adding a current sensor 641 in series with the load. A current sense signal 671 from current sensor 641 is compared with a voltage signal 672 to detect phase delay (and thus power factor) in phase delay detector 620. A phase error amplifier 650 receives this phase delay information 673 and adjusts power controller 100 through its modulator 170 to vary reflected capacitance, and thus minimize phase delay (bringing PF toward unity). This loop preferably has a bandwidth of 20 Hz or less. (Power controller 100 is shown as a dotted block with its modulator 170 drawn as though separate to emphasize its function in this illustration.)

PFC capacitors can resonate with other elements in the power system. To limit or eliminate this possibility, an optional additional current sensor 642 is placed between controller 100 output and PFC capacitor 630, in series. Within current sensor 642, the fundamental line frequency is filtered out, as will be appreciated by those skilled in the art, to leave only harmonic currents information. Current sense signal 674 containing this harmonic information is then sent to a fast error amplifier 660 (several KHz bandwidth) which in turn adjusts modulator 170 of power controller 100 to reduce or eliminate the harmonics. Thus power controller 100 responds to slow signals from power factor error amplifier 650, and fast signals from harmonic error amplifier 660. The result is an automatic power factor corrector 600 with infinite variability and which does not tend to resonate with other elements in a power distribution system.

Figure 11:
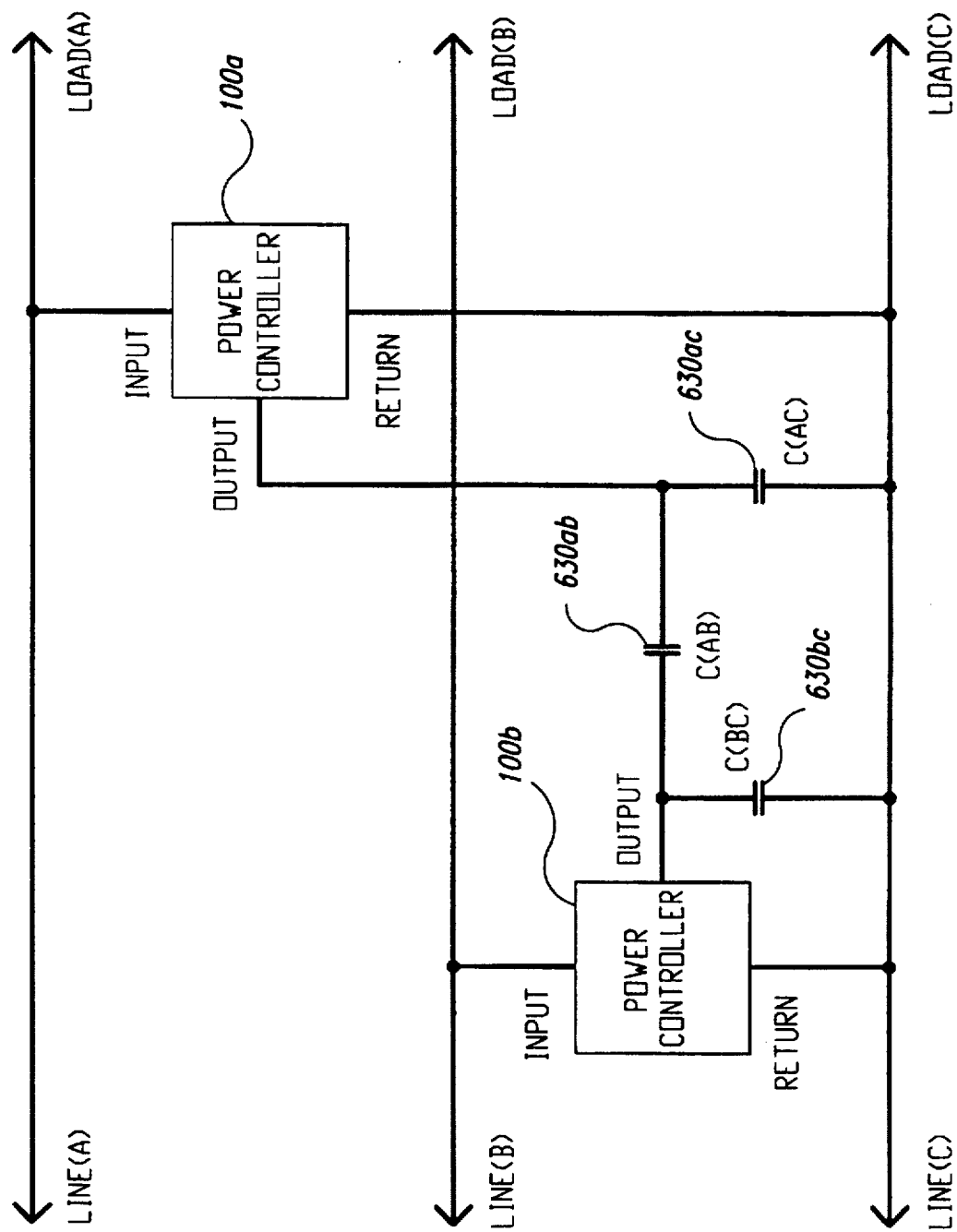
FIG. 11. is a schematic and partial block diagram of a three phase power factor controller of the invention.

The disclosed PFC method and apparatus can also be configured for three phase PFC for effecting balanced loads by employing two power controller units 100a and 100b, and three PFC capacitors 630ab, 630ac and 630bc as shown in FIG. 11. In this embodiment, power controller 100a is preferably in parallel between a first AC line (A) and a third AC line (C), and power controller 100b is in parallel between a second AC line (B) and the third AC line. Capacitor 630ac is preferably connected between the output of controller 100a and AC line (C), capacitor 630bc is connected between the output of controller 100b and AC line (C), and capacitor 630ab is connected between the output of controller 100a and the output of controller 100b.

Figure 12:
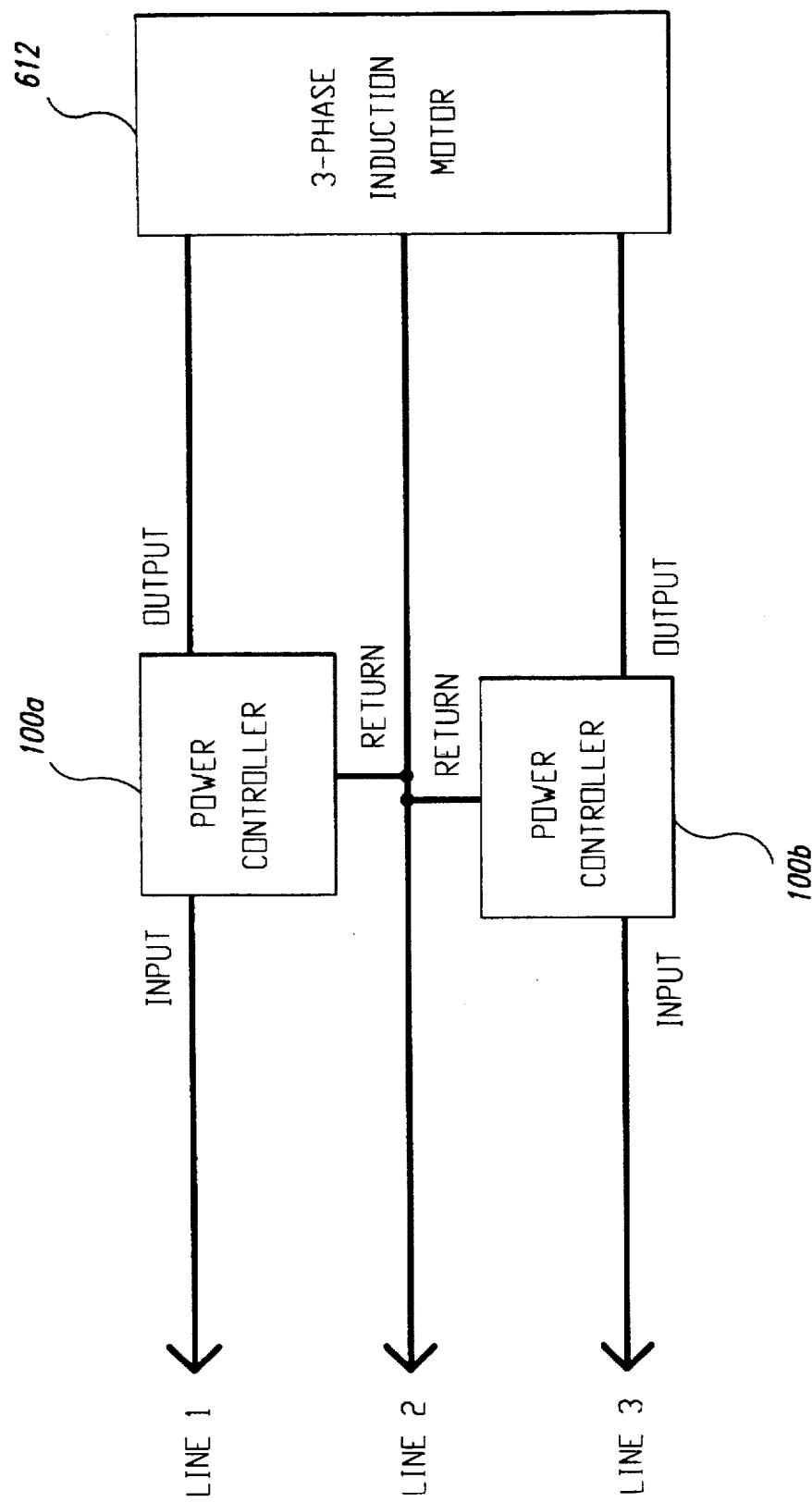
FIG. 12. is a schematic and partial block diagram of an alternate method of power factor correction with soft start current limits.

FIG. 12 shows a configuration for controlling three phase induction motor 612, as an alternate PFC correction method accomplished by lowering the motor terminal voltage via controllers 100a, 100b when motor 612 in not operating at full load. Power controller 100a is in series in line 1, and power controller 100b is in series in line 3. Both controllers return to line 2. Independent modulation and control of controllers 100a, 100b results in optimal power conversion and control for induction motor 612, while also optimizing power quality on the three phase line system.

The power controller 100 of the invention is also well adapted to be used in combination with simple componentry to fashion fully (and optionally automatically) adjustable components, such as capacitors, inductors, resistors, and the like.

Figure 13:
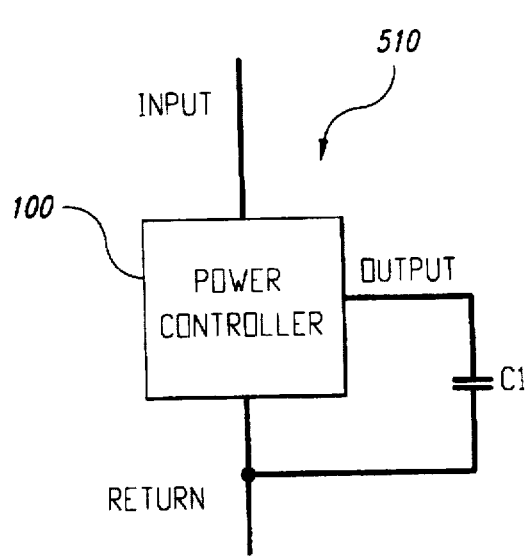
FIG. 13. is a schematic and partial block diagram of an adjustable capacitor of the invention.

FIG. 13 shows adjustable capacitor 510. Power controller 100 variably reflects the capacitance of capacitor C1 back onto the input and return connections. The reflected capacitance value ranges between 0 and the full rated value of C1. Typical applications would be adjustable power line filters with variable frequency and amplitude characteristics, and adjustable components of harmonic current traps and rejecters. See discussion infra of FIGS. 24 and 25.

Figure 14:
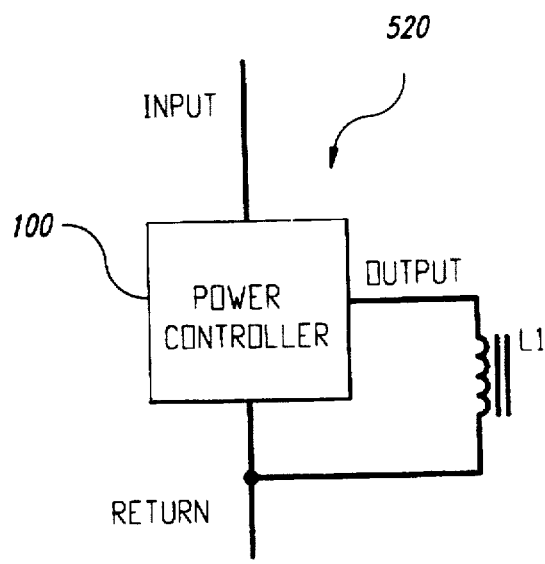
FIG. 14. is a schematic and partial block diagram of an adjustable inductor of the invention.

FIG. 14 shows adjustable inductor 520 whose reflected inductance can be varied, via controller 100, between the full rated value of L1 and (theoretically) infinity. Its applications are as complementary components to the variable capacitor in its applications as disclosed above. It should be noted that for a duty cycle D and a full rated inductance L, reflected inductance is given by the formula:

$$L_{ref} = L/D^2$$

Figure 16:
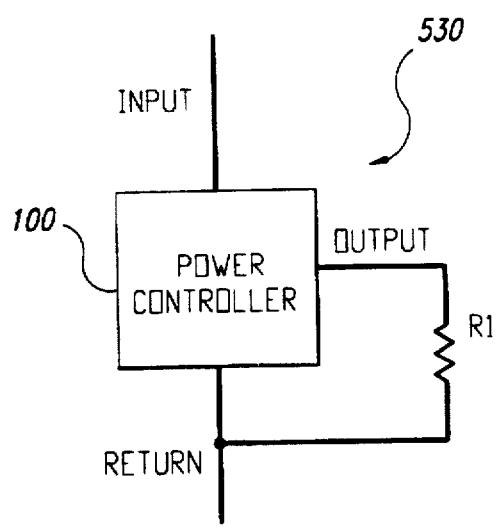
FIG. 16. is a schematic and partial block diagram of an adjustable resistor of the invention.

FIG. 16 shows variable resistor 530 with a resistance value adjustable, via controller 100, between R1 and (theoretically) infinity. This topology would have applications including motor controls, a variable damping element in power line filters, and variable AC/DC power loads for testing electrical equipment (transformers, generators, AC power supplies, inverters, power distribution systems, and the like).

Figure 15:
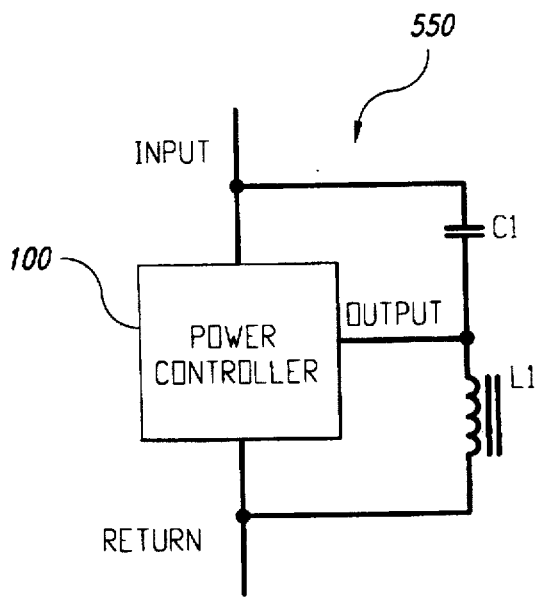
FIG. 15. is a schematic and partial block diagram of an adjustable harmonic rejecter of the invention.

FIG. 15 shows adjustable harmonic rejector 550 with controller 100. Inductor L1 is connected between the output of controller 100 and the return, while capacitor C1 is connected between output and input of controller 100. As controller 100 duty cycle is increased, both reflected capacitance and inductance decrease. The result is a parallel LC filter with resonance tunable over a wide frequency range. This would have application in power line harmonic voltage and current reduction. For instance, the unit could be installed in series with the power line and its resonance adjusted to reject a desired harmonic. In response to changes of load on the system, it may be suitably readjusted, either manually or automatically, for optimum performance.

Figure 17:
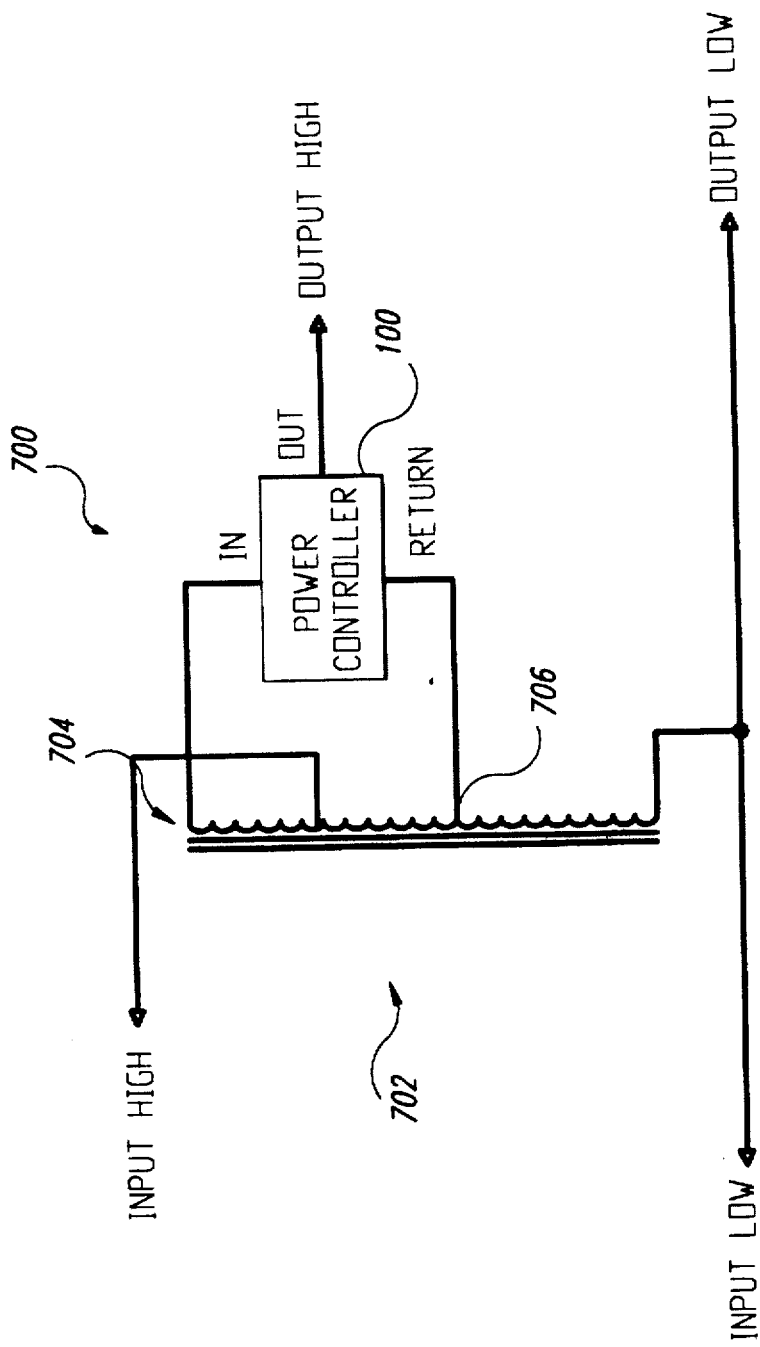
FIG. 17. is a schematic and partial block diagram of an AC power conditioner of the invention.

FIG. 17 shows AC power conditioner 700 for regulating output voltage over a limited range. This configuration allows use of a lower voltage power controller than one otherwise required for operation over a larger voltage range.

Input voltage is fed to autotransformer 702 having two output taps 704, 706. Lower tap 706 is configured to be the lowest desired voltage step down, while higher tap 704 is set for the highest desired voltage step up. Power controller 100 is connected between these two taps and thus varies the output voltage from one tap to the other in infinitely variable increments. Conditioner/converter 700 may thus be used either as a constant output voltage regulator for input voltages that vary, or as a device for providing varying output voltages from a constant input voltage.

Using this configuration, if an output variation range of +/−20% is desired, then power controller 100 itself need only withstand 40% of the input voltage. This allows available semiconductors to regulate much higher output voltages than if the controller 100 were operating without autotransformer 702. In lower voltage circuits (such as 120 VAC), it allows inexpensive low voltage semiconductors (<100 VDC) to be used, giving significant cost advantages over other line conditioning methods.

Figure 18:
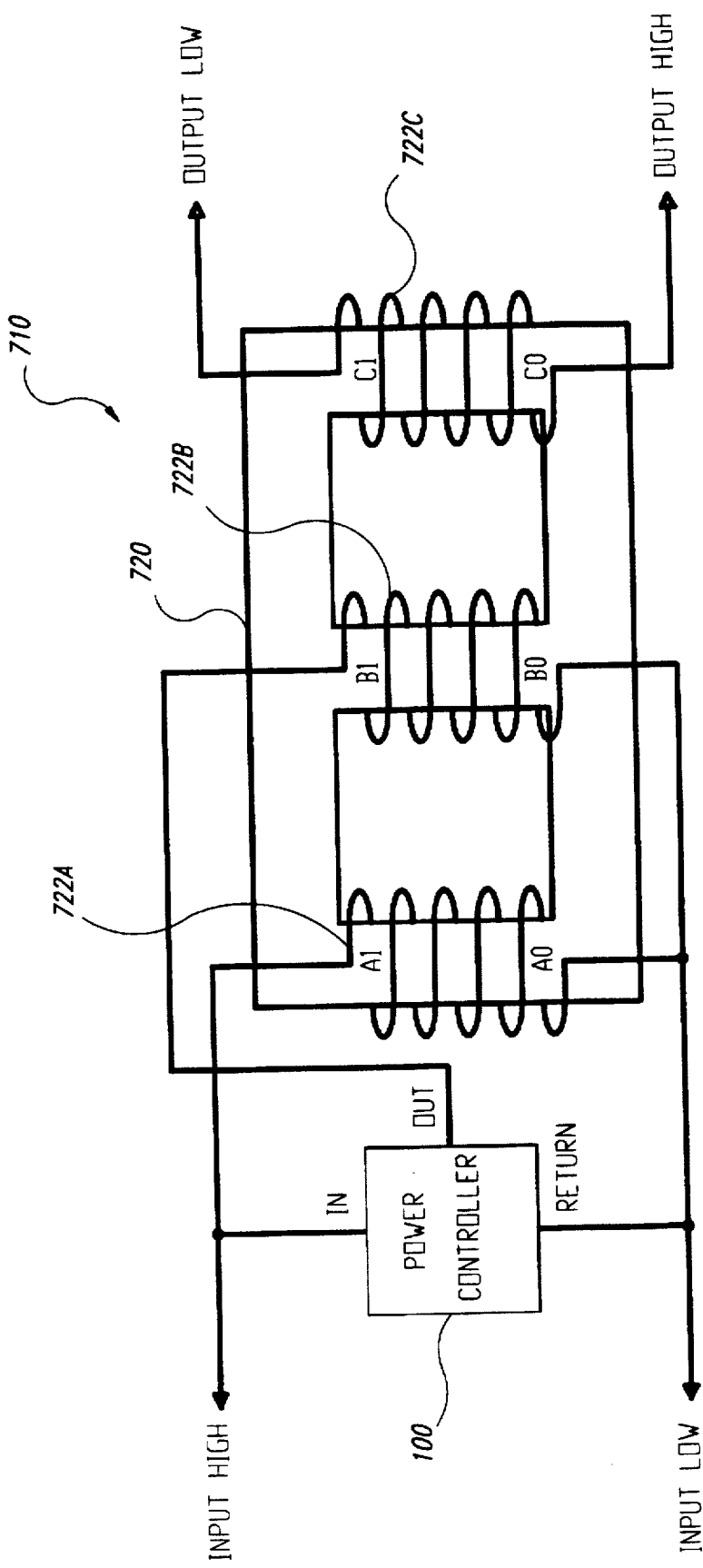
FIG. 18. is a schematic and partial block diagram of an isolated output AC power conditioner of the invention.

FIG. 18 shows isolated output AC power conditioner 710 having power controller 100 and three part coupled magnetic structure 720. This topology provides isolated variable output voltage over a limited output range while also providing galvanic isolation from input to output.

Magnetic structure 720 comprises three core sections which are coupled at each end. Each section has associated winding 722A, 722B, and 722C respectively, each winding having a number of turns $N_A$, $N_B$, and $N_C$ respectively. For operation within the saturation limits of the core, voltages V may be applied to the windings according to the following formula:

$$V_A/N_A + V_B/N_B + V_C/N_C = 0$$

while the corresponding formula for current is:

$$I_A N_A = I_B N_B = I_C N_C$$

In this isolated output AC power conditioner, input voltage is applied directly across winding 722A. Power controller 100 receives the same input voltage and applies a variable voltage across winding 722B with the number of turns $N_B$ corresponding to the maximum amount of output voltage regulation range desired. The voltage delivered from the output winding 722C can be described therefore by the following formula:

$$V_{out}/N_C = -V_{in}/N_A - V_{controller}/N_B$$

With this topology, $N_B$ can be much greater than $N_A$ as the output regulation range is reduced. Thus power controller 100 output current is reduced for a given total conditioner 710 output current (and power), and line regulation over the desired range is accomplished with a relatively smaller power regulator 100. Costs are thus reduced, efficiency is increased, and larger amounts of power may be regulated than by merely cascading a power controller with a standard isolation transformer. Applications for this topology are anticipated in line voltage regulation, data processing, telecommunications, and medical equipment.

Figure 19:
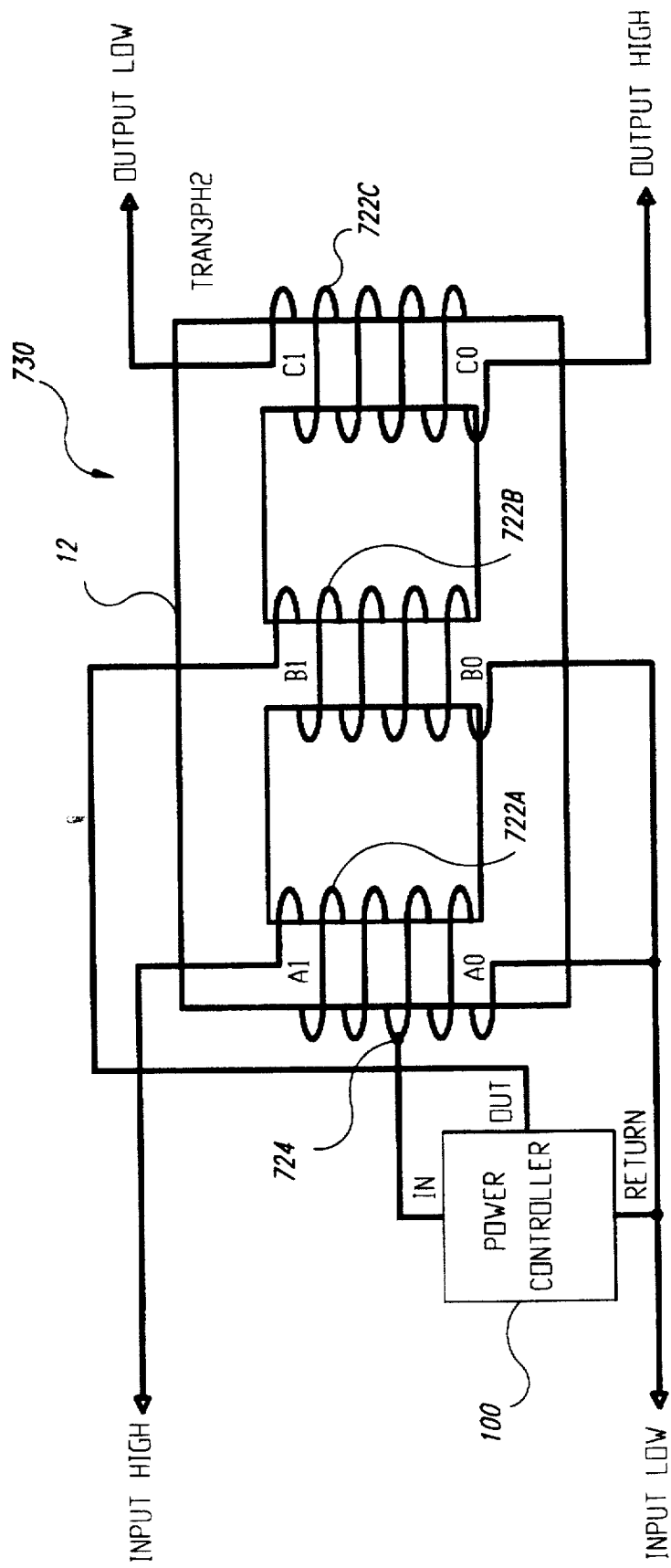
FIG. 19. is a schematic and partial block diagram of a high voltage input AC power conditioner of the invention.

FIG. 19 shows high voltage input AC power conditioner 730. The circuitry is substantially the same as for FIG. 18 above, except that power controller 100 is operated from a voltage that is lower than the input voltage. Winding 722A has tap 724 in it, creating in effect a step down autotransformer for use by controller 100. The tap voltage is selected according to the voltage input limitations of power controller 100. All other specification and operation is the same as above.

This topology can regulate voltages far beyond what could be done with conventional power semiconductors employed in direct regulation. As an example, the input voltage can be as much as 13,200 V, and yet regulation can be accomplished using nothing more than standard semiconductors (having ratings such as 1200 V or 1700 V). Applications are envisioned in regulated distribution transformers such as those dropping distribution voltages down to 120/240 VAC for residential and commercial customers.

Figure 20:
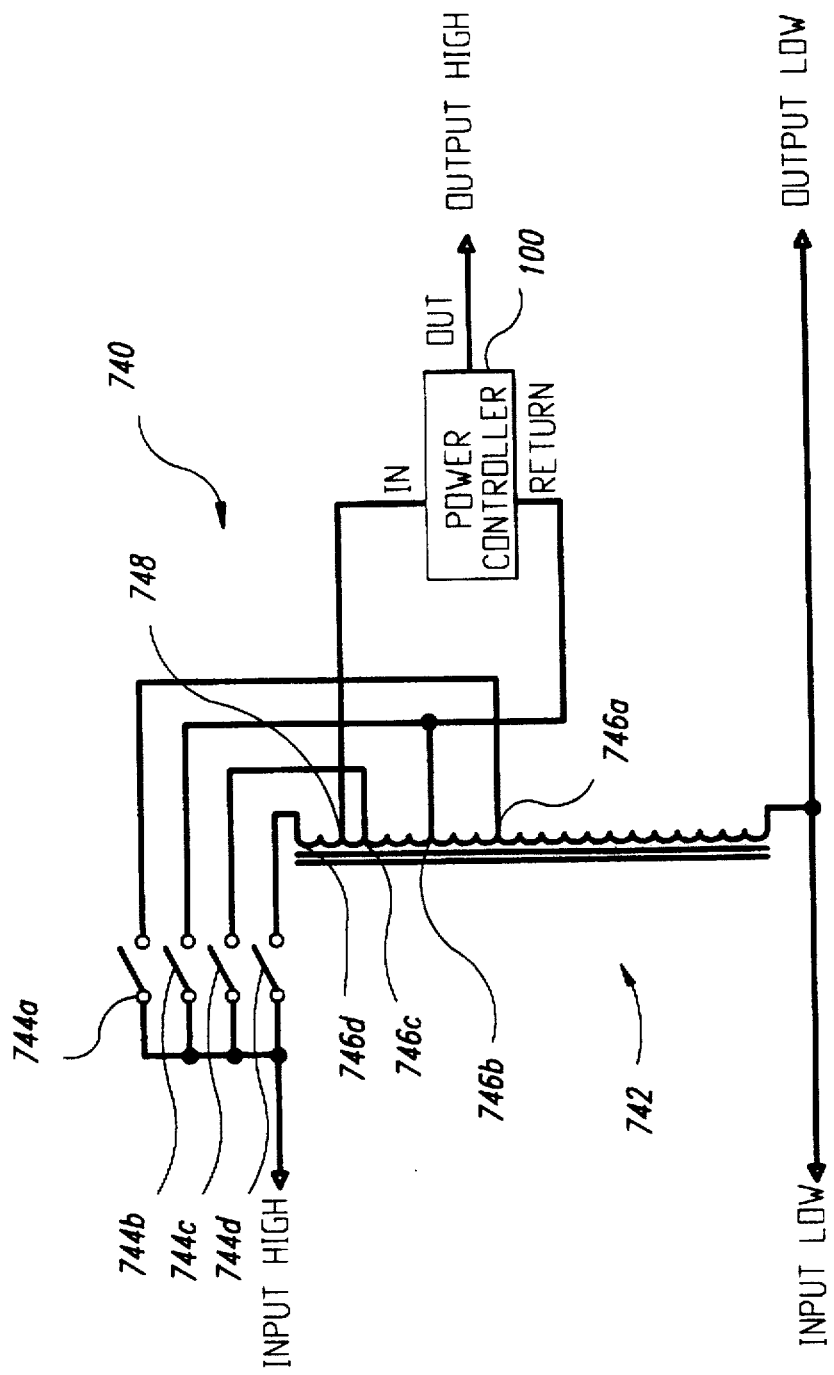
FIG. 20. is a schematic and partial block diagram of an AC hybrid power conditioner of the invention.

FIG. 20 shows AC hybrid power conditioner 740, similar to AC power conditioner 700 disclosed above, except that it is capable of connecting different taps 746a–d in autotransformer 742 to the input voltage. Output regulation is generally accomplished in two steps. The first step comprises selecting and connecting an appropriate tap 746a, b, c, or d on autotransformer 742 to the input voltage. The tap is selected so that the input 748 of power controller 100 is higher than the desired output voltage and the return of power controller 100 is lower than the desired output voltage. Connection is preferably accomplished using thyristor switches 746a–d, and in a manner similar to connection in conventional tap switching line conditioners.

The second step consists of modulating controller 100 to provide an adjustable output voltage that can be varied infinitely between its input and return voltages. By combining these steps, precise regulation of output voltages is possible over a wide range of input voltages. This circuit topology allows controller 100 to operate over a smaller voltage range so that lower voltage power controller components may be employed for a given output voltage. At the same time, infinite output adjustability is maintained, providing superior regulating capability over conventional power conditioners.

Figure 21:
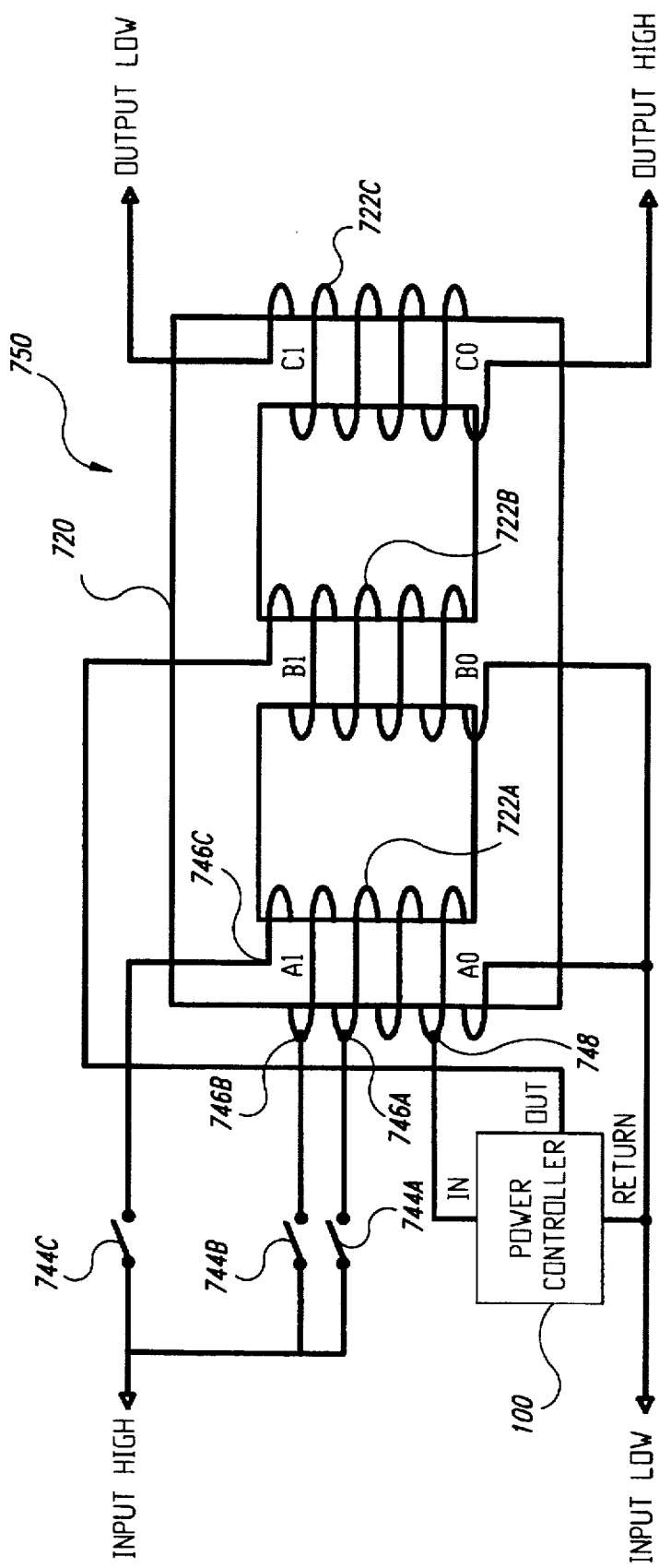
FIG. 21. is a schematic and partial block diagram of a hybrid isolated AC power conditioner of the invention.

FIG. 21 shows hybrid isolated AC power conditioner 750, similar to high voltage input AC power conditioner 730 disclosed above, particularly in that it uses a three part magnetic structure 720 and power controller 100, but it adds tap selecting capability to the winding 722A. Tap connection is preferably accomplished using thyristor switches 744a–c to connect the proper tap 746a–c of winding 722A to the input voltage. This tap selection allows a coarse adjustment of the output voltage in one or more discreet steps. Fine adjustment is achieved by varying the voltage on winding 722B by varying the output of power controller 100.

With tap selecting capability in this embodiment of the invention, power controller 100 is only required to regulate over a much smaller range than otherwise practical or useful, and the amount of power delivered by controller 100 to the transformer is decreased. This allows either a decrease in the size of the power controller, or an increase in the output capability of the conditioner system for a given size power controller.

Figure 22:
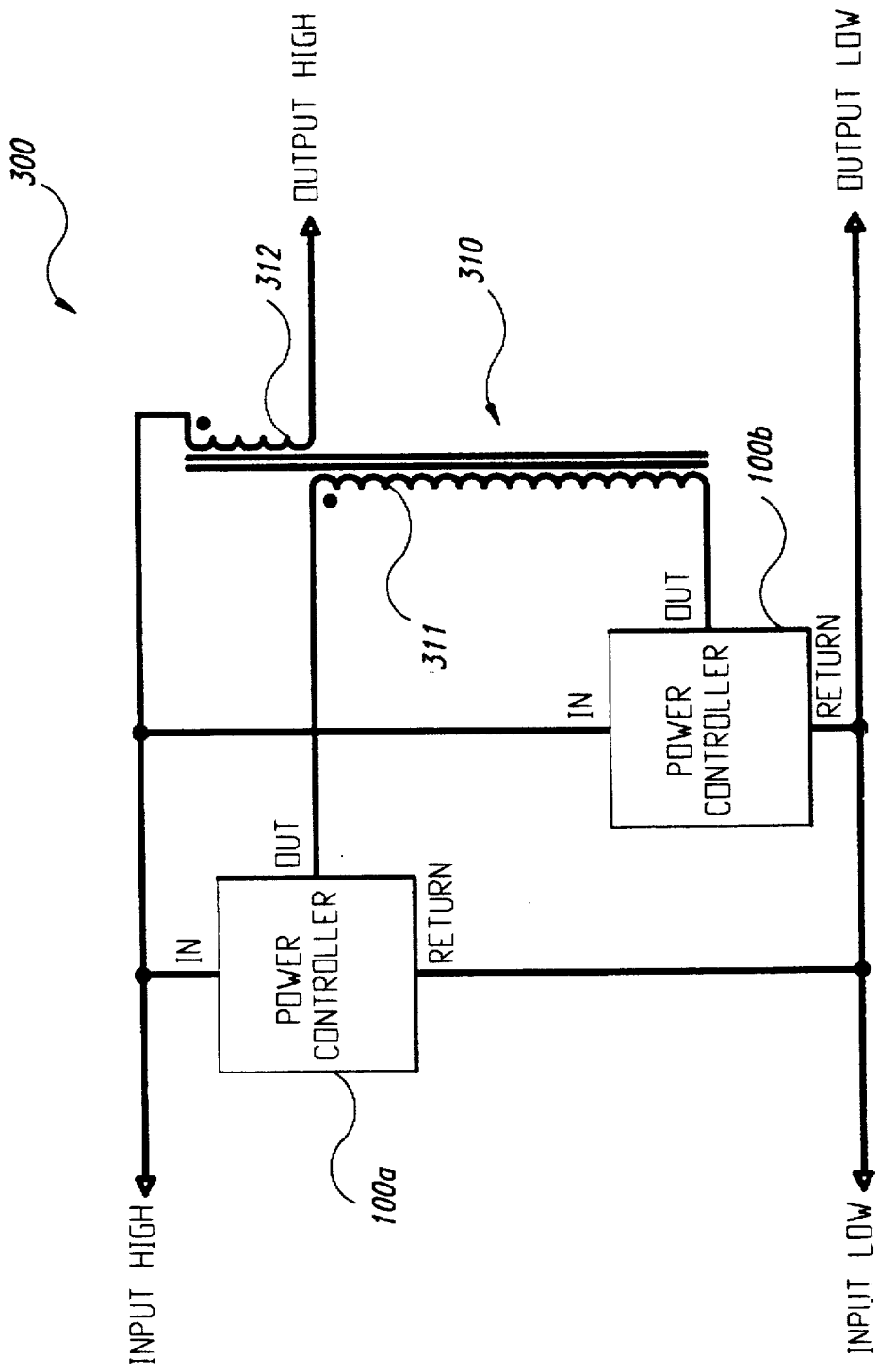
FIG. 22. is a schematic and partial block diagram of an AC voltage regulator of the invention.

FIG. 22 schematically illustrates preferred AC voltage regulator 300 of the invention. This circuit employs two power controllers 100a and 100b that drive opposite ends of a primary winding 311 of transformer 310. Secondary winding 312 is in series with Input line (high).

Regulator 300 functions by using the secondary 312 output to either add to or subtract from the input voltage. Adding and subtracting are controlled by separately modulating the outputs of controllers 100a and 100b. There are three modes of operation.

In mode 1, both controllers are at zero output voltage. The transformer primary 311 is thus clamped to no voltage, while the current is allowed to pass through secondary 312 (and through the primary as reflected through the transformer). Zero primary voltage translates to zero secondary voltage, and the input voltage is thereby maintained from input to output with voltage neither added nor subtracted.

In mode 2, controller 100a output is increased over the output of controller 100b (preferably held at a minimum). In this mode, a variable amount of voltage from controller 100a on primary 311 adds a proportional voltage (according to turns ratio of primary to secondary windings) to the input voltage, and output voltage is thereby effectively increased.

In mode 3, controller 100b output is increased over the output of controller 100a (now preferably at a minimum). In this mode, a variable amount of voltage from controller 100b on primary 311 subtracts a proportional voltage (according to turns ratio of primary to secondary windings) from the input voltage, and output voltage is thereby effectively decreased.

For industrial level (460 VAC) voltage regulators, a +/-10% variability is required. This would mean a transformer turns ratio (primary to secondary) in the preferred circuit of approximately 10:1. With this circuit and conventional power semiconductor technology, it should be possible to provide regulation at power levels in excess of 1 MW per phase.

Figure 23:
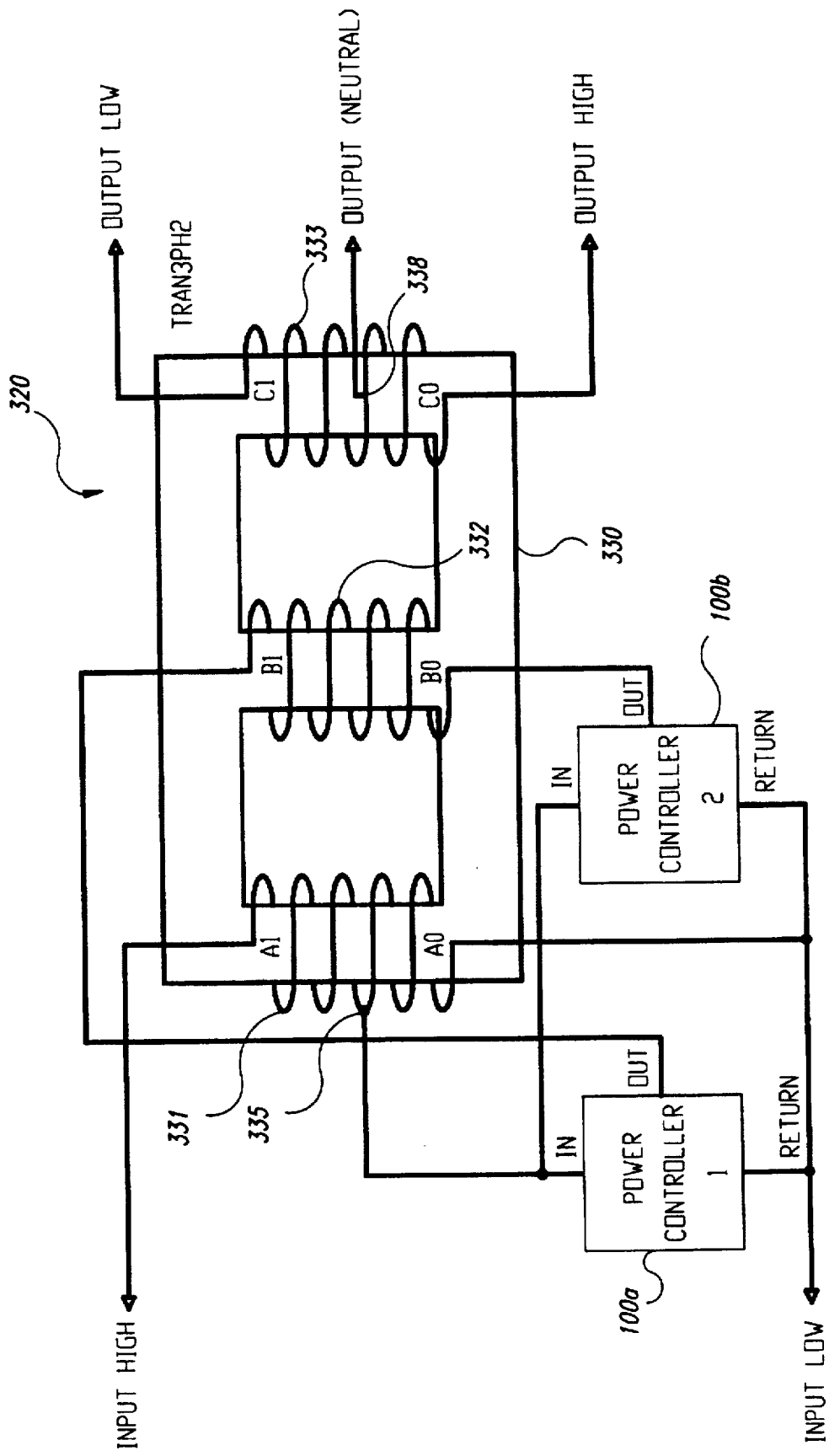
FIG. 23. is a schematic and partial block diagram of an isolated AC voltage regulator of the invention.

FIG. 23 schematically illustrates preferred isolated AC voltage regulator 320 of the invention. Regulator 320 is anticipated to be used to take utility distribution voltages and provide isolated and regulated low voltage outputs for residential, commercial, and industrial applications.

In operation, input voltage is applied to input winding 331 and provides thereby most of the voltage that is transformed to output winding 333. Two power controllers 100a and 100b operate in accordance with the disclosure herein from a lower voltage tap 335 on winding 331. Controllers 100a and 100b are used to drive intermediate winding 332, which preferably has several time the number of turns of winding 331. Output winding 333 has conventional neutral tap 338.

The two power controllers operate in essentially the same three modes as described in conjunction with the apparatus shown in FIG. 22. In total, the controllers provide a small part of the total voltage transformed to winding 333 to effectively adjust output voltage up or down from nominal voltage value, or to clamp to the nominal value. Advantages of this circuit include continuous amplitude adjustability over the entire regulating range, and no mechanical contacts to wear out.

Figures 24, 25:
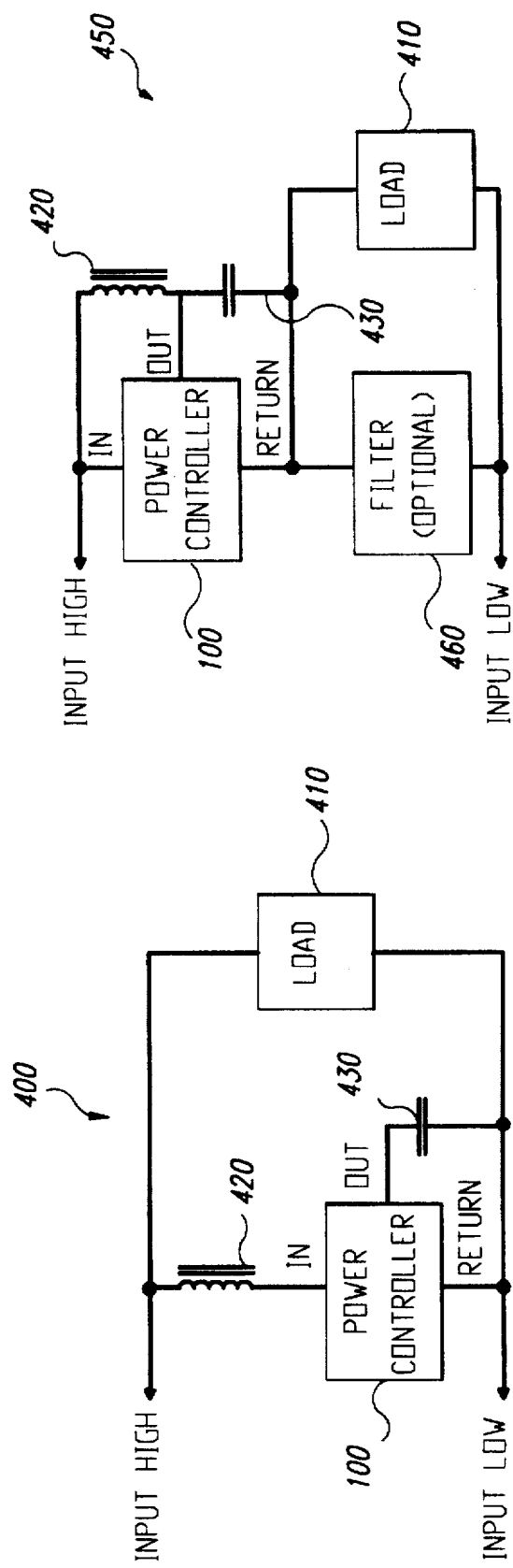
FIG. 24. is a schematic and partial block diagram of an adjustable parallel harmonic filter of the invention.
FIG. 25. is a schematic and partial block diagram of an adjustable series harmonic rejector of the invention.

FIG. 24 schematically illustrates adjustable parallel harmonic filter 400 embodiment of the invention. Filter 400 is a system that employs the power controller 100 of the invention as a kind of adjustable capacitor, as more fully disclosed elsewhere herein. PFC capacitor 430 lies between the output of controller 100 and low side of load 410. Inductor 420 lies between input high and controller 100 input. Controller 100 is in parallel with load 410.

It is envisioned that filter system 400 will find use as a harmonic current trap, with the advantage of continuous adjustability of its resonant frequency. With continuous adjustability, filter 400 may be fine tuned for better performance and less ringing with other power line components. It may also be readjusted at any time in accordance with the changing line and load conditions in the electrical system.

FIG. 25 schematically illustrates adjustable series harmonic rejector 450 embodiment of the invention. Rejector 450 is a system application of the adjustable harmonic rejector 550 discuss in conjunction with FIG. 15, and which functions as a kind of adjustable parallel LC network. Inductor 420 lies between controller 100 input and output, while PFC capacitor 430 lies between controller 100 output and high side of load 410. Controller 100 is in series with load 410. Optional filter 460 is in parallel with load 410.

Rejector 450 is envisioned for use to selectively reject any harmonic current in a system so as to keep it from conducting back to source. Rejector 450 may be optionally aided by addition of parallel filter 460 to absorb any rejected harmonic current. As with the adjustable parallel harmonic filter 400, rejector 450 may be fine tuned for optimum performance and to accommodate changing power distribution conditions.

Preliminary testing of prototypes of power controller embodiments of the invention are very encouraging. In a test of a power factor corrector embodiment of the invention, a one horsepower pump (running dry, at minimum load, at maximum load), a window fan (at low, medium, high), and a radial arm saw (running idle) were tested, and input current was first measured without any attempt at power factor correction, and PF was noted. Then the corrector of the invention was applied to correct PF, and input current was again measured, and PF noted. The results are summarized in the table below. All measurements were taken at 120 VAC, 60 Hz.

| Test Unit | Input Current w/o PFC | Power Factor | Input Current w/PFC | Power Factor | Comments |
| --- | --- | --- | --- | --- | --- |
| 1 HP pump | 10.74A | .365 | 5.31A | .950 | Dry operation |
| 1 HP pump | 14.16A | .782 | 11.68A | .986 | pumping, min. load |
| 1 HP pump | 15.10A | .853 | 13.72A | .990 | pumping, max. load |
| Window fan | | .649 | | .988 | Low, 93 W |
| Window fan | | .690 | | .986 | Medium, 141 W |
| Window fan | | .694 | | .985 | High, 180 W |
| Radial saw | 7.41A | .281 | 3.15A | .845 | Running, idle |

These tests, while providing good numbers, highlighted the importance of proper treatment of resonances between the PFC capacitors and parasitic system inductances. The occurrence of this problem is well known. Most manufacturers of conventional PFC systems use an elaborate and expensive array of optional harmonic "traps" that have to be customized to a specific installation. Passive damping, as will be appreciated by those skilled in the art, can to some extent be built into a system to reduce harmonic currents. But active damping, which is preferred, yields better PFC results, increased efficiency, and reduced cost. In active damping, small signal control circuitry is used to vary the duty cycle of the PWM in opposition to the harmonics, causing the power controller to reject the harmonics, and leading to yet higher PF. It is anticipated that it will also lead to reduced resonances in the utility service as well.

Figure 26A:
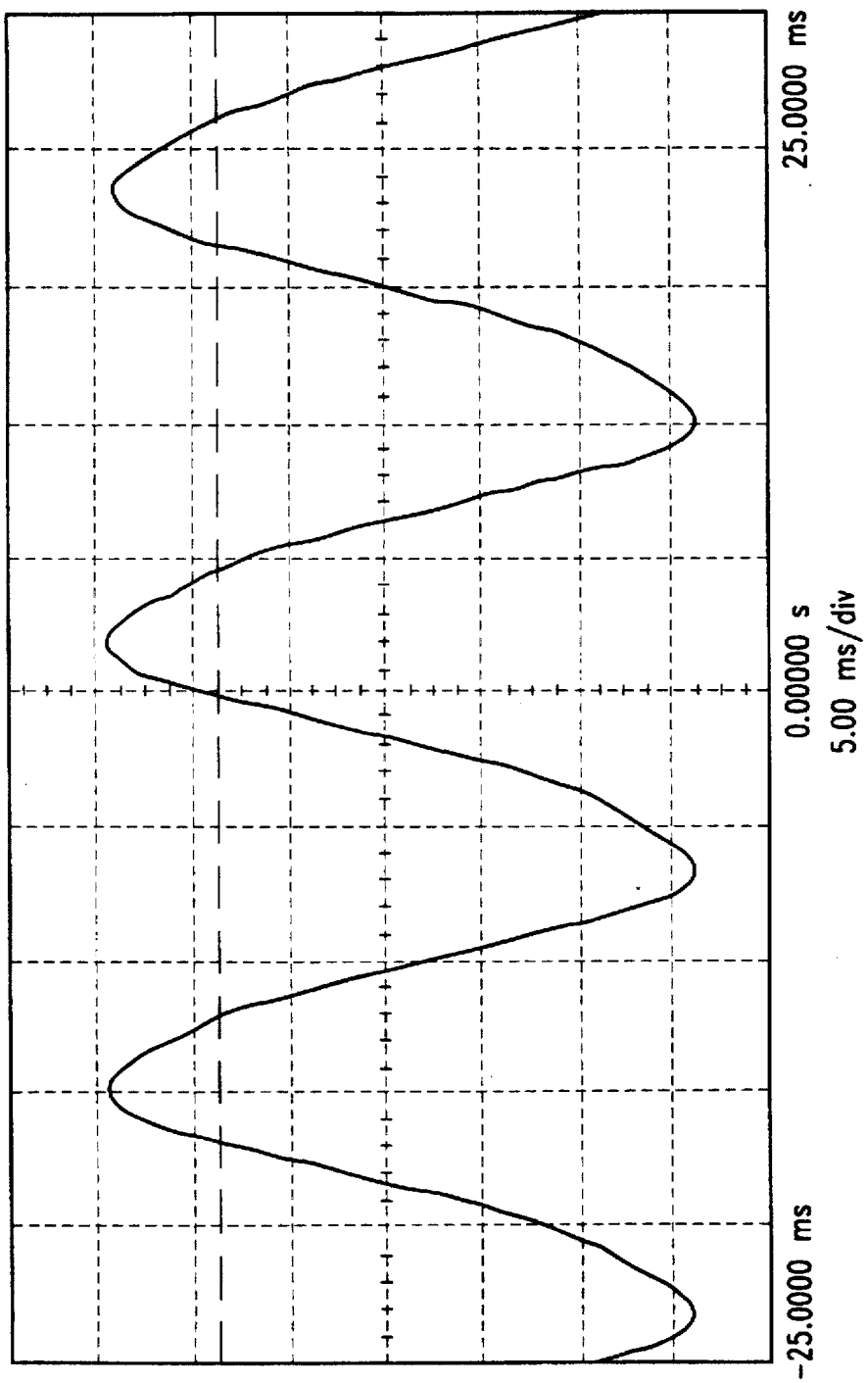
FIG. 26. is a set a–e of printouts of oscilloscope readings during a test on a prototype PF corrector of the invention.

A second round of testing on 1 HP, running at no load, was conducted to test and demonstrate PFC effectiveness of the power factor corrector of the invention with added capability for active damping. FIG. 26a is an oscilloscope printout showing the line current waveform of the 1 HP motor running at no load. Input voltage is 120 VAC. In this test, PF was noted at below 0.4, with input current at 10.7 ARMS. The waveform shows slight distortion.

Figure 26B:
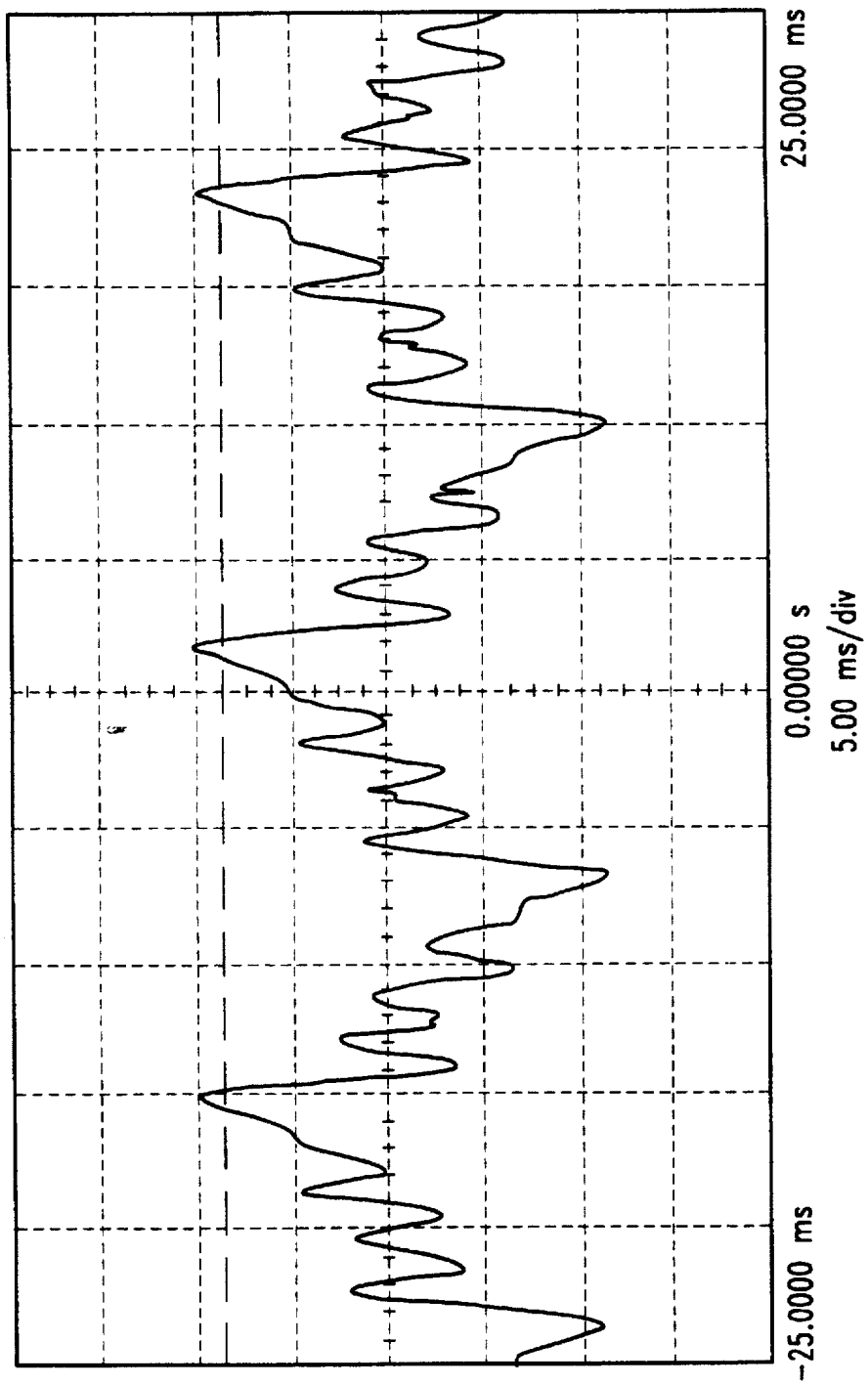
Figure 26C:
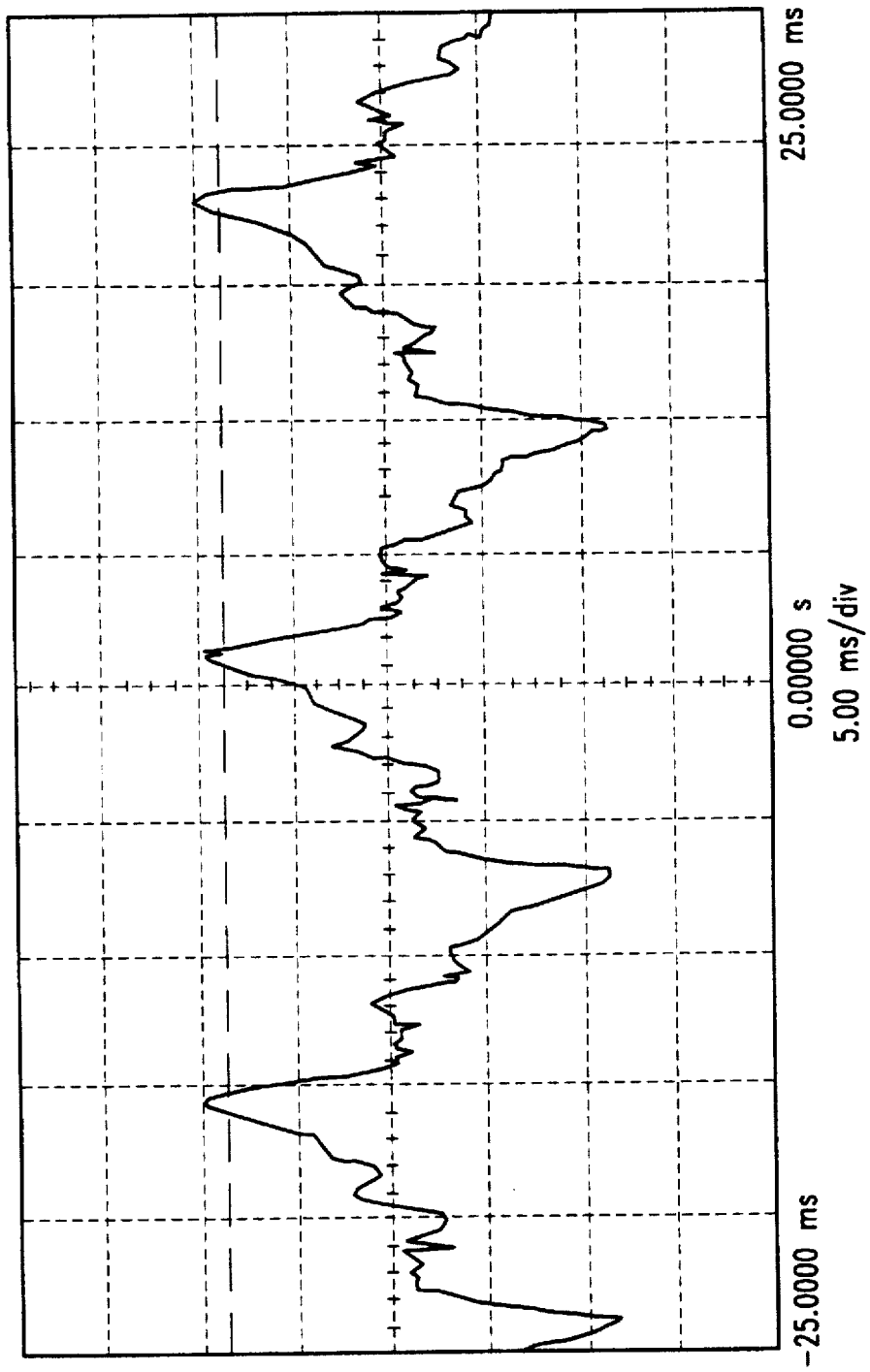

FIG. 26b is an oscilloscope printout showing the effect of the prototype invention PFC, but without any damping. Input current was substantially reduced to 4.8 ARMS. Significant resonance and current draw at the ninth harmonic (540 Hz) can be seen. FIG. 26c is an oscilloscope printout showing the results of adding a passive (and power consuming) damper into the circuit. Input current drops to 4.6 ARMS, and the ringing is somewhat diminished.

Figure 26D:
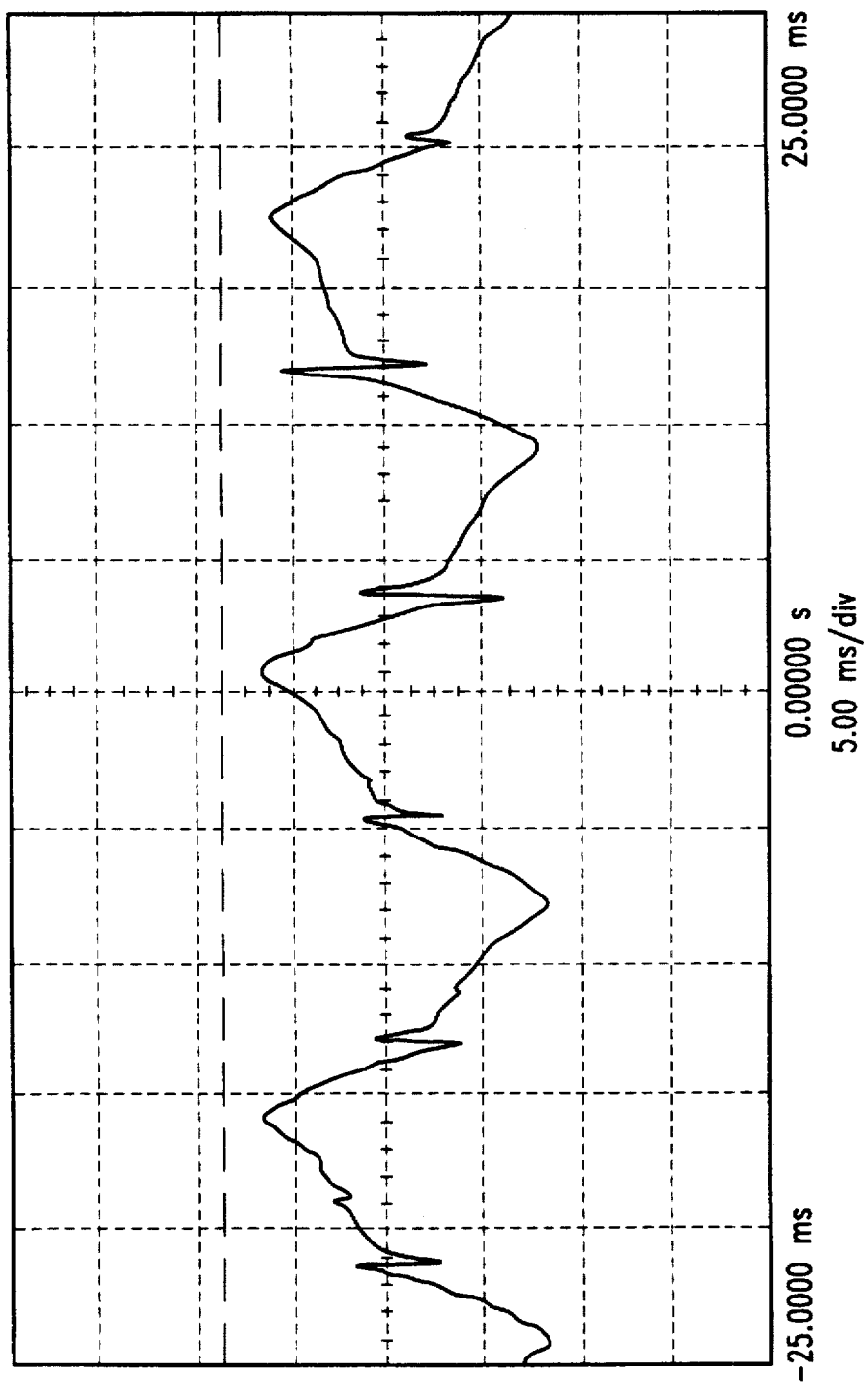

FIG. 26d is an oscilloscope printout showing the results of removing the passive damping and employing the prototype PFC's own active damping circuit. It can be seen that the ringing has been eliminated (though there remain in this screen traces of crossover glitches caused by polarity switching in the error amplifier, which has since been remedied). Some distortion remains on the waveform, this is believed to be the uncorrected distortion existing on the original motor current waveform. Input current is reduced to 4.3 ARMS, even lower than with passive damping applied.

Figure 26E:
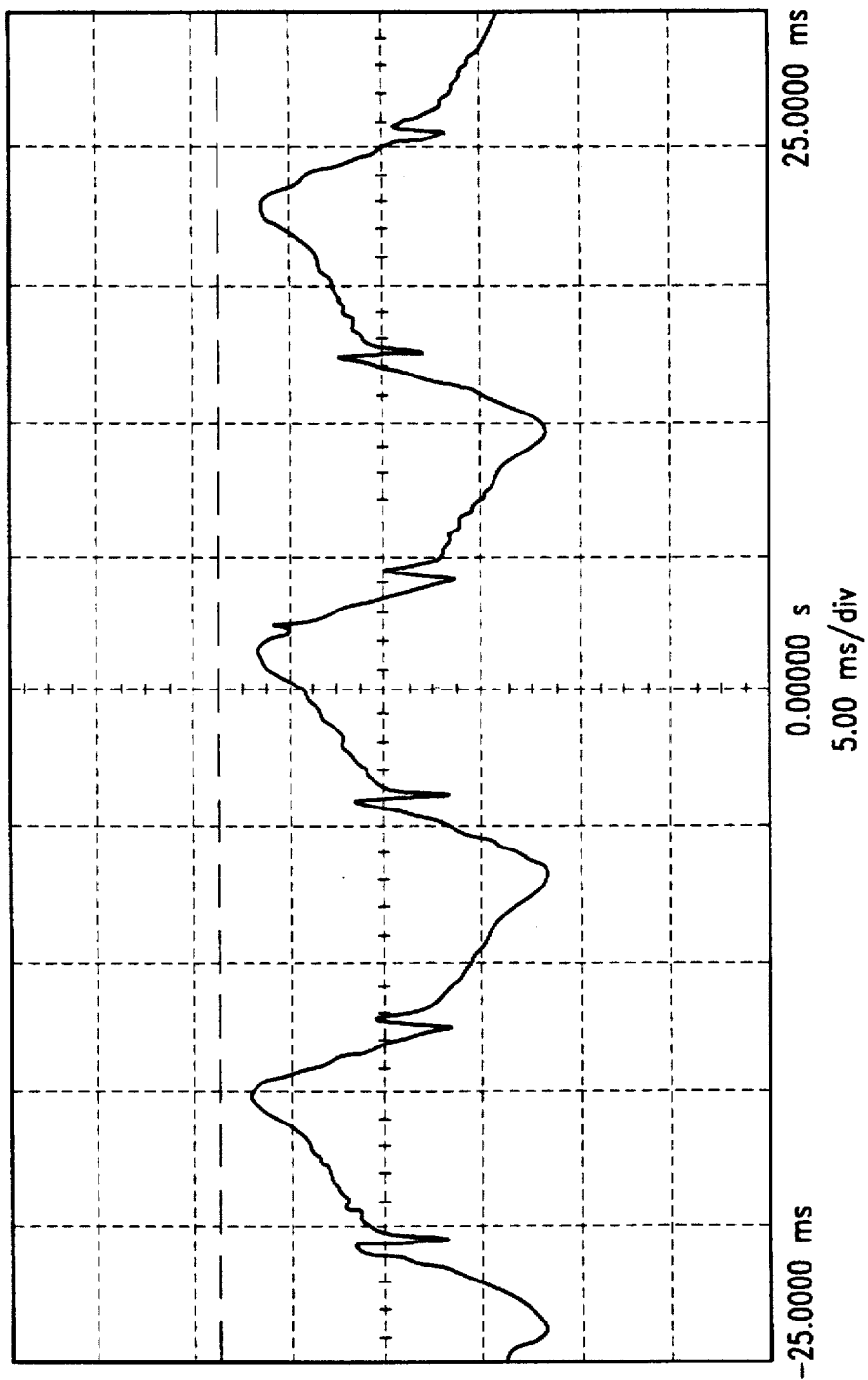

FIG. 26e is an oscilloscope printout showing, for comparison purposes, the effect of both active and passive damping applied. In most respects the waveform is identical to the previous printout, but the passive damper clearly contributes to greater power consumption as the input current increases to 4.5 ARMS, without significant improvement in the waveform over active damping alone.

Better results than these however are anticipated at the higher voltages more common in industrial use. These tests were conducted at 120 VAC where IGBT and diode voltage drops are more significant in terms of percentage loss, than would be the case at the higher voltages. Also at 240 VAC and 480 VAC, there will be less converter loss per KVAR. Secondly, the tests were not conducted in a worst case resonance scenario; in an industrial plant with far less "clean" power, multiple motor and PFC resonant combinations typically create fuse blowing and PFC capacitor failures, and have much greater need for the kind of PFC demonstrated here.

Another test was performed as a comparison of a conventional SCR power control device with the invention power controller (sometimes also referred to in the table and graphs as an "MPC"). FIG. 27 is a spreadsheet of comparative data on SCR performance vs. an invention prototype power controller. A prototype power controller in accordance with this disclosure was run, in "buck" mode, at 120 VACRMS from 100% to 0% of range. Both KW efficiency and KVA efficiency were noted, as well as both input and output KW, KVA, PF and %THD-rmsa. The SCR device was run over the same range. The results are summarized in the spreadsheet, and the trend of the data, at least in certain respects, is evident from reading the spreadsheet. While the SCR remains highly efficient throughout the range from 100% voltage to 0%, and the MPC declines at 50% then falls off badly below 20%, the MPC sustains high input PF to a much lower voltage (still 0.89 at 40%; the SCR falls below 0.9 around 85%), and maintains near unity output PF down to below 10%. Similarly, the MPC sustains lower input and output current draw throughout the range, and is sharply lower in %THD on both input and output sides.

Figure 28:
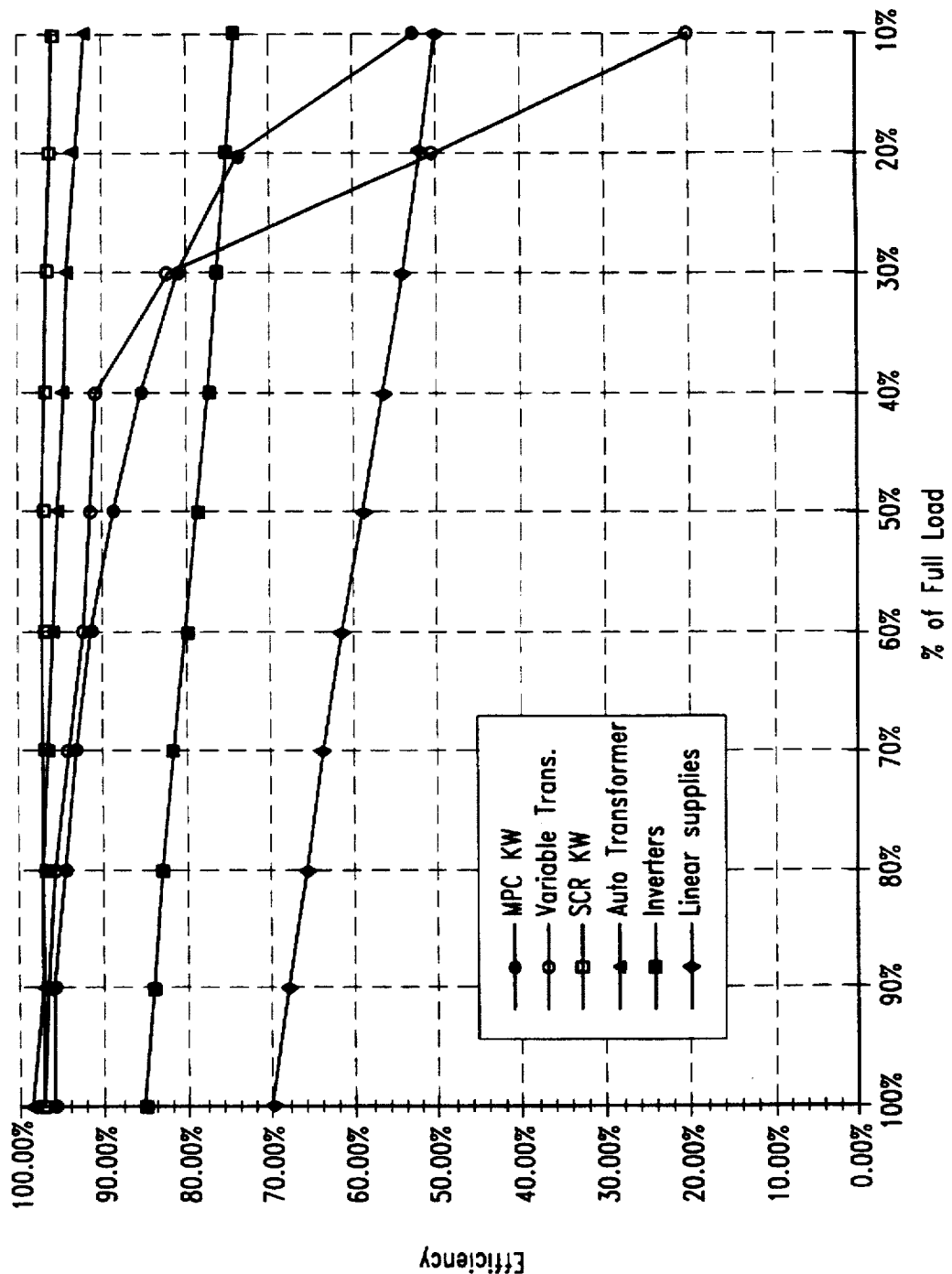
FIG. 28. is a graph of relative efficiencies of conventional power control devices compared to the power controller of the invention.
Figure 29:
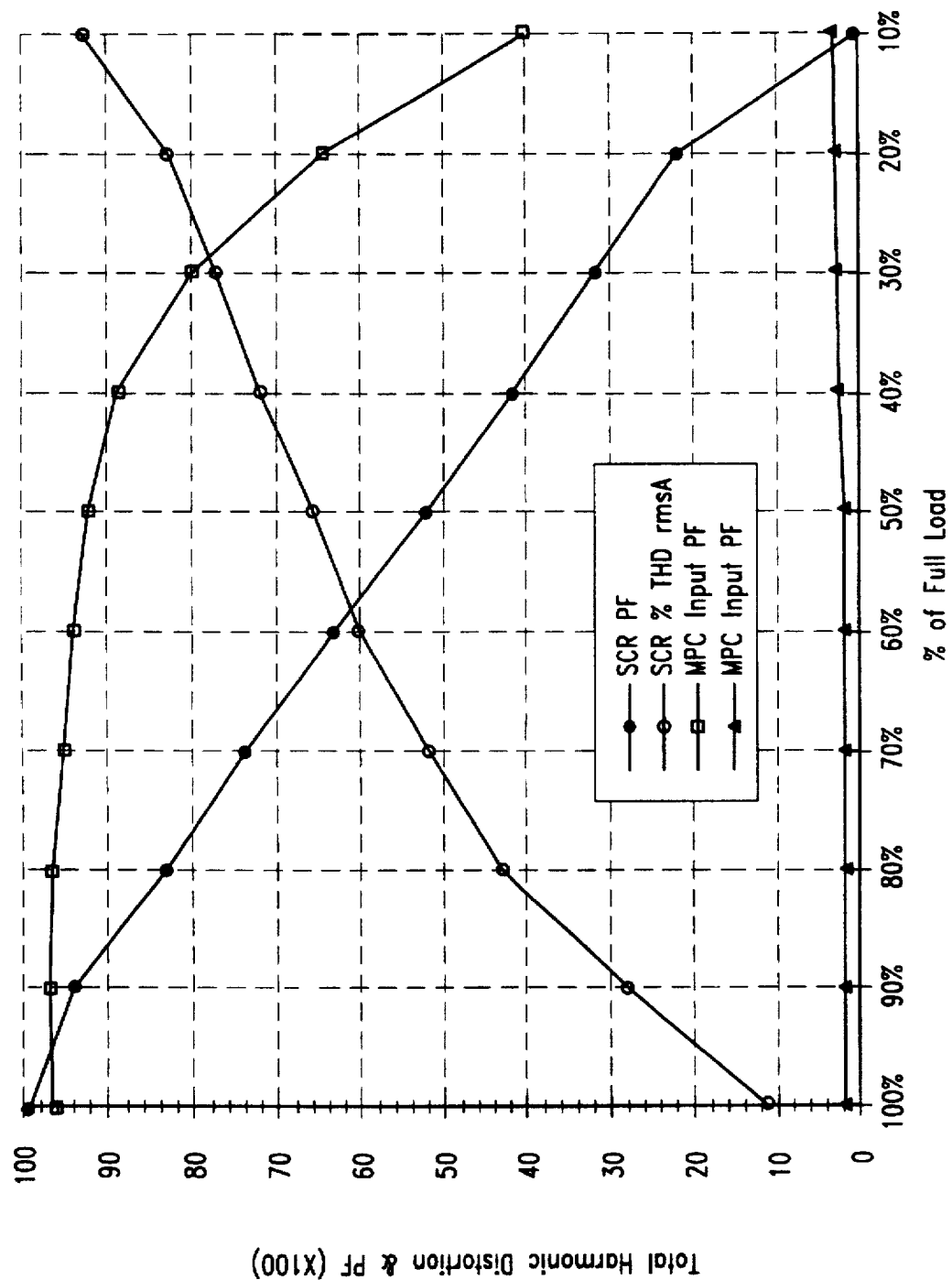
FIG. 29. is a graph of relative harmonics and power factor (for resistive loads) of conventional power control devices compared to the power controller of the invention.

FIG. 28 is a graph of relative efficiencies of conventional power control devices compared to the power controller of the invention, and FIG. 29 is a graph of relative harmonics and power factor (for resistive loads) of conventional power control devices compared to the power controller of the invention. A study of both graphs together suggests that, while SCR's with their noted efficiency stay at the top of the graph in FIG. 28, they are clearly the worst in PF and %THD performance in FIG. 29. In FIG. 28, it is apparent that the MPC's KW efficiency is quite close (above 90%) to that of the SCR down to 60% of range, and exceeds the efficiency of both inverters and linear supplies down to about 20% of range. In summary, the MPC compared to conventional devices has good efficiency, good power factor, and excellent harmonics (THD<1%).

With regard to componentry and assembly methodology above referred to, but not otherwise specified or described in detail herein, the workings and specifications of such components and the manner in which they may be made or assembled or used, both cooperatively with each other and with the other elements of the invention described herein, to effect the purposes herein disclosed, are all believed to be well within the knowledge of those skilled in the art. No concerted attempt to repeat here what is generally known to the artisan has therefore been made.

INDUSTRIAL APPLICABILITY

An electrical converter implemented with a high frequency (>10 KHz) and using switchmode power conversion techniques achieves great advantage over existing circuits, including higher output, smaller size, light weight, lower cost, greater efficiency, electrically quieter operation, and better reliability.

In broad terms, the largest markets for the invention are related to electrical power quality products and electrical energy conservation products. At least half of the applications currently identified for the invention relate to improving the efficiency of, or cleaning up power problems caused by, electrical motors and/or motor drives. The Edison Electric Institute reports that there are one billion electric motors in the US alone, and that they consume collectively nearly half of the total electricity consumed in the US.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A single stage AC to AC power controller for controlling an AC input voltage to a load, the input voltage having one or more phases, the controller comprising:

a circuit comprised of four independently controllable switches and at least one inductor, one such circuit for each input line to be regulated, the switches and inductor(s) of the circuit arranged in a conventional power regulator topology, whereby a selected regulator topology may be implemented, depending upon the position of the inductor(s) with respect to the switches and to the input voltage;

the controller further comprising logic control having a polarity detector in parallel with the input voltage, the polarity detector having two outputs; and a duty cycle modulator having two outputs; each of the outputs of the polarity detector and of the duty cycle modulator being inverted with respect to one another;

wherein the logic control separately controls each switch so that there is always an electrically conducting path through the switches wherein there is at least one switch conducting.

2. The controller of claim 1 wherein at least one of the switches is electronically controllable, and the outputs from the polarity detector and from the modulator are electrical.

3. The controller of claim 1 further comprising within the logic control circuitry four OR gates, each OR gate fed by an output from the polarity detector through a turn off delay and by an output from the duty cycle modulator through a turn on delay, such that first and third OR gates each receive as a first input a first output from the polarity detector, and second and fourth OR gates each receive as a first input a second output from the polarity detector; and such that first and second OR gates receive as a second input a first output from the duty cycle modulator, and third and fourth OR gates receive as a second input a second output from the duty cycle modulator;

whereby output from each OR gate controls one switch.

4. The controller of claim 3 wherein the electronically controllable switch is a solid state switching device, further having in parallel across the source and drain of the device a diode poled to have a sense opposite to the switch.

5. The controller of claim 4 wherein the solid state switching device is a transistor taken from the group of devices comprised of individual switching devices conventionally known as BJT, IGBT, MOSFET, MCT and GTO.

6. The controller of claim 4 wherein a first pair of switches is connected between the input and the inductor, and a second pair of switches is connected between the inductor and return.

7. A logic controller for controlling the duty cycle of a single stage AC to AC power controller having four independently controlled separate switches, the logic controller having a polarity detector in parallel with the input voltage, the polarity detector having two outputs; the logic controller further having a duty cycle modulator having two outputs; each of the outputs of the polarity detector and of the duty cycle modulator being inverted with respect to one another;

wherein the logic control separately controls each switch so that there is always an electrically conducting path through the switches wherein there is at least one switch conducting.

8. The logic controller of claim 7 further comprising four OR gates, each OR gate fed by an output from the polarity detector through a turn off delay and by an output from the duty cycle modulator through a turn on delay, such that first and third OR gates each receive as a first input a first output from the polarity detector, and second and fourth OR gates each receive as a first input a second output from the polarity detector; and such that first and second OR gates receive as a second input a first output from the duty cycle modulator, and third and fourth OR gates receive as a second input a second output from the duty cycle modulator;

whereby output from each OR gate controls one switch.

9. A method of controlling an electrical voltage in a single stage AC to AC converter comprising the step(s) of:

Varying an amplitude of an input voltage waveform independent of its frequency to produce a selected output voltage to a load, wherein the step is accomplished by variable duty cycle modulation switching of an input voltage through an inductor after the manner of conventional power regulator topology, wherein said step of variable duty cycle modulation switching of the input voltage includes modulating the switching during operation so that there is always an electrically conducting path through the switches, wherein there is always at least one switch conducting.

10. A variable power factor corrector comprising: a power factor capacitor in parallel with a load on an AC line; and a line driven variable voltage output in series with the capacitor for varying the amount of capacitance reflected back onto the AC line, wherein the variable voltage output is implemented in a single stage power controller for regulating an AC to AC input voltage conversion the controller comprising:

a circuit comprised of a pair of switches and an inductor, the switches and inductor of the circuit arranged in a conventional power regulator topology, whereby a selected regulator topology may be implemented, depending upon the position of the inductor with respect to the switches and to the input voltage;

wherein each of the pair of switches is bi-directional and implemented as a pair of unidirectional switches;

the controller further comprising logic control having a polarity detector in parallel with the input voltage, the polarity detector having two outputs and a duty cycle modulator having two outputs; each of the outputs of the polarity detector and of the duty cycle modulator being inverted with respect to one another;

wherein the logic control separately controls each switch so that there is always an electrically conducting path through the switches wherein there is at least one switch conducting.

11. The power factor corrector of claim 10 further comprising:

a current sensor in series with a load on the AC line;

a phase delay detector that receives voltage input from the AC line and current sense input from the current sensor;

a power factor error amplifier fed by an output of the phase delay detector, the amplifier feeding a signal to the power controller logic control;

whereby a selected power factor correction may be automatically maintained.

12. The power factor corrector of claim 11 further comprising:

a second current sensor in series between the power controller and the power factor capacitor;

a harmonic error amplifier fed by an output of the current sensor, the amplifier feeding a signal to the power controller logic control for auto resonance suppression and harmonic dampening.

13. The power factor corrector of claim 10 further comprising:

a plurality of capacitors and a plurality of power controllers for variable power factor correction in a three phase AC system, a first power controller in parallel between a first AC line and a third AC line, and a second power controller in parallel between a second AC line and a third AC line; and a first capacitor connected between an output of the first power controller and the third AC line, a second capacitor connected between an output of the second power controller and the third AC line, and a third capacitor connected between an output of the first power controller and an output of the second power controller.

* * * * *